US011546948B2

(12) United States Patent
Shah et al.

(10) Patent No.: US 11,546,948 B2
(45) Date of Patent: Jan. 3, 2023

(54) RADIO NETWORK MEASUREMENTS IN CASE OF MISSING REFERENCE SIGNALS

(71) Applicant: Panasonic Intellectual Property Corporation of America, Torrance, CA (US)

(72) Inventors: Rikin Shah, Langen (DE); Ming-Hung Tao, Frankfurt am Main (DE); Hidetoshi Suzuki, Kanagawa (JP)

(73) Assignee: Panasonic Intellectual Propertvy Corporation of America, Torrance, CA (US)

( * ) Notice: Subject to any disclaimer, the term of this patent is extended or adjusted under 35 U.S.C. 154(b) by 62 days.

(21) Appl. No.: 16/953,061

(22) Filed: Nov. 19, 2020

(65) Prior Publication Data
US 2021/0076416 A1 Mar. 11, 2021

Related U.S. Application Data

(63) Continuation of application No. PCT/EP2019/075893, filed on Sep. 25, 2019.

(30) Foreign Application Priority Data

Nov. 12, 2018 (EP) .................................... 18205774

(51) Int. Cl.
H04W 74/08 (2009.01)
H04W 72/04 (2009.01)
H04W 74/00 (2009.01)

(52) U.S. Cl.
CPC ..... *H04W 74/085* (2013.01); *H04W 72/0453* (2013.01); *H04W 74/006* (2013.01)

(58) Field of Classification Search
CPC ........... H04W 74/085; H04W 72/0453; H04W 74/006; H04W 36/30
(Continued)

(56) References Cited

U.S. PATENT DOCUMENTS 10,779,327 B2 * 9/2020 Ahn .................... H04W 56/001
2014/0162646 A1 6/2014 Lee et al.
(Continued)

FOREIGN PATENT DOCUMENTS

EP 3 297 386 A1 3/2018
GB 2512382 A 10/2014
(Continued)

OTHER PUBLICATIONS

3GPP TR 36.889 V13.0.0, "3$^{rd}$ Generation Partnership Project; Technical Specification Group Radio Access Network; Study on Licensed-Assisted Access to Unlicensed Spectrum; (Release 13)," Jun. 2015, 87 pages.
(Continued)

*Primary Examiner* — Kwang B Yao
*Assistant Examiner* — Syed M Bokhari
(74) *Attorney, Agent, or Firm* — Seed IP Law Group LLP

(57) ABSTRACT

The present disclosure relates to a user equipment (UE) comprises a receiver, which receives reference signals from a serving base station on which the UE is camping, the serving base station controlling an unlicensed serving radio cell in which the UE is located. Processing circuitry of the UE monitors the reception of reference signals to determine a number of reference signals that are continuously missing. The processing circuitry determines to perform cell reselection from the unlicensed serving radio cell on which the UE is camping to another radio cell that has a different frequency than the unlicensed serving radio cell, in case the determined number of reference signals that are continuously missing is above a threshold.

16 Claims, 12 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2019/0215864 A1* | 7/2019 | Yang | H04W 74/0808 |
| 2020/0212987 A1* | 7/2020 | Priyanto | H04W 52/42 |
| 2020/0236713 A1* | 7/2020 | Chen | H04W 68/005 |
| 2021/0028978 A1* | 1/2021 | Zhou | H04B 7/0695 |

FOREIGN PATENT DOCUMENTS

| | | |
|---|---|---|
| WO | 2018/068808 A1 | 4/2018 |
| WO | 2018/102650 A1 | 6/2018 |

OTHER PUBLICATIONS

3GPP TR 38.801 V14.0.0, "3$^{rd}$ Generation Partnership Project; Technical Specification Group Radio Access Network; Study on new radio access technology; Radio access architecture and interfaces (Release 14)," Mar. 2017, 91 pages.
3GPP TR 38.804 V14.0.0, "3$^{rd}$ Generation Partnership Project; Technical Specification Group Radio Access Network; Study on New Radio Access Technology; Radio Interface Protocol Aspects (Release 14)," Mar. 2017, 57 pages.
3GPP TR 38.913 V15.0.0, "3$^{rd}$ Generation Partnership Project; Technical Specification Group Radio Access Network; Study on Scenarios and Requirements for Next Generation Access Technologies; (Release 15)," Jun. 2018, 39 pages.
3GPP TS 38.211 V15.2.0, "3$^{rd}$ Generation Partnership Project; Technical Specification Group Radio Access Network; NR; Physical channels and modulation (Release 15)," Jun. 2018, 96 pages.
3GPP TS 38.211 V15.3.0, "3$^{rd}$ Generation Partnership Project; Technical Specification Group Radio Access Network; NR; Physical channels and modulation (Release 15)," Sep. 2018, 96 pages.
3GPP TS 38.212 V15.2.0, "3$^{rd}$ Generation Partnership Project; Technical Specification Group Radio Access Network; NR; Multiplexing and channel coding (Release 15)," Jun. 2018, 98 pages.
3GPP TS 38.213 V15.2.0, "3$^{rd}$ Generation Partnership Project; Technical Specification Group Radio Access Network; NR; Physical layer procedures for control (Release 15)," Jun. 2018, 99 pages.
3GPP TS 38.215 V15.3.0, "3$^{rd}$ Generation Partnership Project; Technical Specification Group Radio Access Network; NR; Physical layer measurements (Release 15)," Sep. 2018, 15 pages.
3GPP TS 38.300 V15.2.0, "3$^{rd}$ Generation Partnership Project; Technical Specification Group Radio Access Network; NR; NR and NG-RAN Overall Description; Stage 2 (Release 15)," Jun. 2018, 87 pages.
3GPP TS 38.304 V15.1.0, "3$^{rd}$ Generation Partnership Project; Technical Specification Group Radio Access Network; NR; User Equipment (UE) procedures in Idle mode and RRC Inactive state (Release 15)," Sep. 2018, 27 pages.
3GPP TS 38.321 V15.3.0, "3$^{rd}$ Generation Partnership Project; Technical Specification Group Radio Access Network; NR; Medium Access Control (MAC) protocol specification (Release 15)," Sep. 2018, 76 pages.
3GPP Ts 38.331 V15.3.0, "3$^{rd}$ Generation Partnership Project; Technical Specification Group Radio Access Network; NR; Radio Resource Control (RRC) protocol specification (Release 15)," Sep. 2018, 445 pages.
ETSI, "Broadband Radio Access Networks (BRAN); 5 GHz high performance RLAN; Harmonized EN covering the essential requirements of article 3.2 of the R&TTE Directive," ETSI EN 301 893 V1.8.1, Mar. 2015, 93 pages.
Extended European Search Report, dated May 20, 2019, for European Application No. 18205774.5, 6 pages.
International Search Report, dated Apr. 14, 2020, for International Application No. PCT/EP2019/075893, 5 pages.

* cited by examiner

US 11,546,948 B2

RADIO NETWORK MEASUREMENTS IN CASE OF MISSING REFERENCE SIGNALS

BACKGROUND

Technical Field

The present disclosure is directed to methods, devices and articles in communication systems, such as 3GPP communication systems.

Description of the Related Art

Currently, the 3rd Generation Partnership Project (3GPP) works at the technical specifications for the next generation cellular technology, which is also called fifth generation (5G).

One objective is to provide a single technical framework addressing all usage scenarios, requirements and deployment scenarios (see e.g., section 6 of TR 38.913 version 15.0.0 incorporated herein by reference), at least including enhanced mobile broadband (eMBB), ultra-reliable low-latency communications (URLLC), massive machine type communication (mMTC). For example, eMBB deployment scenarios may include indoor hotspot, dense urban, rural, urban macro and high speed; URLLC deployment scenarios may include industrial control systems, mobile health care (remote monitoring, diagnosis and treatment), real time control of vehicles, wide area monitoring and control systems for smart grids; mMTC deployment scenarios may include scenarios with large number of devices with non-time critical data transfers such as smart wearables and sensor networks. The services eMBB and URLLC are similar in that they both demand a very broad bandwidth, however are different in that the URLLC service may preferably require ultra-low latencies.

A second objective is to achieve forward compatibility. Backward compatibility to Long Term Evolution (LTE, LTE-A) cellular systems is not required, which facilitates a completely new system design and/or the introduction of novel features.

BRIEF SUMMARY

Non-limiting and exemplary embodiments facilitate providing improved procedures for performing cell reselection.

In one general first example, the techniques disclosed here feature a user equipment comprising a receiver, which receives reference signals from a serving base station on which the UE is camping, the serving base station controlling an unlicensed serving radio cell in which the UE is located. Processing circuitry of the UE monitors the reception of reference signals to determine a number of reference signals that are continuously missing. The processing circuitry, which in operation, determines to perform cell re-selection from the unlicensed serving radio cell on which the UE is camping to another radio cell that has a different frequency than the unlicensed serving radio cell, in case the determined number of reference signals that are continuously missing is above a threshold.

In one general first example, the techniques disclosed here feature a method comprising the following steps performed by the UE. The UE receives reference signals from a serving base station on which the UE is camping, the serving base station controlling an unlicensed serving radio cell in which the UE is located. The UE monitors the reception of reference signals to determine a number of reference signals that are continuously missing. The UE determines to perform cell re-selection from the unlicensed serving radio cell on which the UE is camping to another radio cell that has a different frequency than the unlicensed serving radio cell, in case the determined number of reference signals that are continuously missing is above a threshold.

It should be noted that general or specific embodiments may be implemented as a system, a method, an integrated circuit, a computer program, a storage medium, or any selective combination thereof.

Additional benefits and advantages of the disclosed embodiments and different implementations will be apparent from the specification and figures. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

In the following exemplary embodiments are described in more detail with reference to the attached figures and drawings.

DETAILED DESCRIPTION

5G NR System Architecture and Protocol Stacks

3GPP is working at the next release for the 5$^{th}$ generation cellular technology, simply called 5G, including the development of a new radio access technology (NR) operating in frequencies ranging up to 100 GHz. 3GPP has to identify and develop the technology components needed for successfully standardizing the NR system timely satisfying both the urgent market needs and the more long-term requirements. In order to achieve this, evolutions of the radio interface as well as radio network architecture are considered in the study item "New Radio Access Technology." Results and agreements are collected in the Technical Report TR 38.804 v14.0.0, incorporated herein in its entirety by reference.

Figure 1:
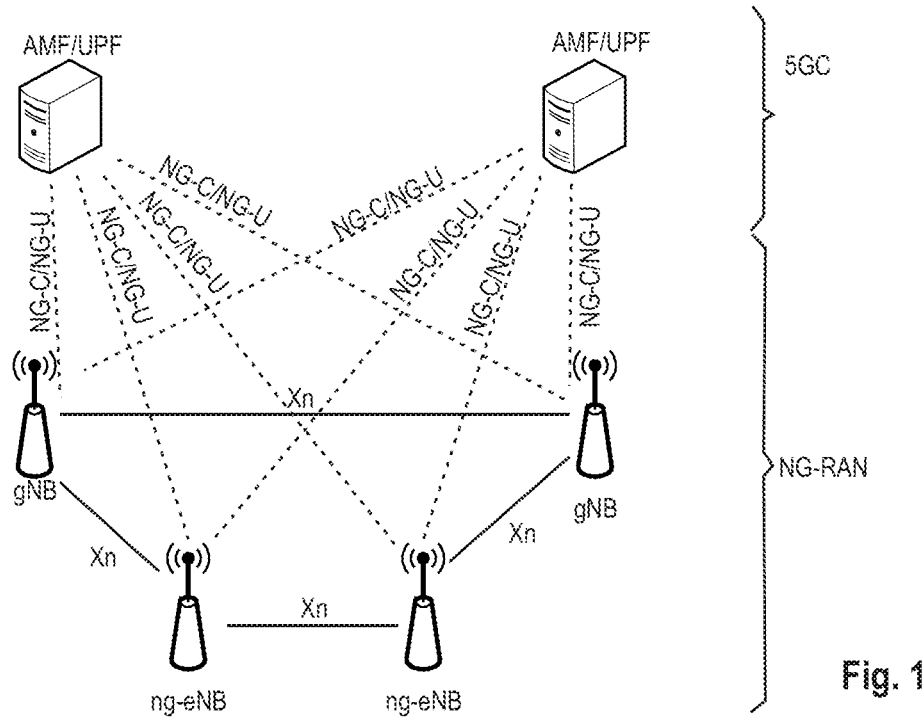
FIG. 1 shows an exemplary architecture for a 3GPP NR system.

Among other things, the overall system architecture assumes an NG-RAN (Next Generation—Radio Access Network) that comprises gNBs, providing the NG-radio access user plane (SDAP/PDCP/RLC/MAC/PHY) and control plane (RRC) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function) (e.g., a particular core entity performing the AMF) by means of the NG-C interface and to the UPF (User Plane Function) (e.g., a particular core entity performing the UPF) by means of the NG-U interface. The NG-RAN architecture is illustrated in FIG. 1 (see, e.g., 3GPP TS 38.300 v15.2.0, section 4 incorporated herein by reference).

Figure 2:
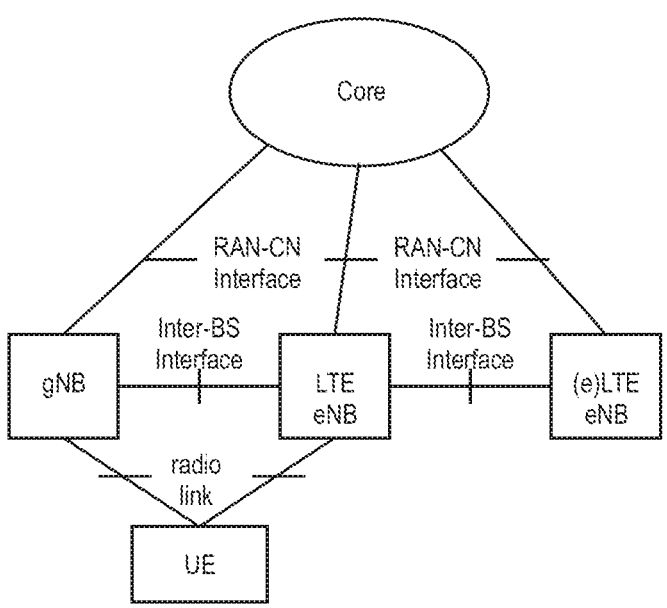
FIG. 2 shows an exemplary user and control plane architecture for the LTE eNB, gNB, and UE.

Various different deployment scenarios can be supported (see, e.g., 3GPP TR 38.801 v14.0.0 incorporated herein by reference). For instance, a non-centralized deployment scenario (see, e.g., section 5.2 of TR 38.801; a centralized deployment is illustrated in section 5.4) is presented therein, where base stations supporting the 5G NR can be deployed. FIG. 2 illustrates an exemplary non-centralized deployment scenario (see, e.g., FIG. 5.2.-1 of said TR 38.801), while additionally illustrating an LTE eNB as well as a user equipment (UE) that is connected to both a gNB and an LTE eNB. The new eNB for NR 5G may be exemplarily called gNB. An eLTE eNB is the evolution of an eNB that supports connectivity to the EPC (Evolved Packet Core) and the NGC (Next Generation Core).

The user plane protocol stack for NR (see, e.g., 3GPP TS 38.300 v15.2.0, section 4.4.1 incorporated herein by reference) comprises the PDCP (Packet Data Convergence Protocol, see section 6.4 of TS 38.300), RLC (Radio Link Control, see section 6.3 of TS 38.300) and MAC (Medium Access Control, see section 6.2 of TS 38.300) sublayers, which are terminated in the gNB on the network side. Additionally, a new access stratum (AS) sublayer (SDAP, Service Data Adaptation Protocol) is introduced above PDCP (see, e.g., sub-clause 6.5 of 3GPP TS 38.300 version 15.2.0 incorporated herein by reference). A control plane protocol stack is also defined for NR (see for instance TS 38.300, section 4.4.2). An overview of the Layer 2 functions is given in sub-clause 6 of TS 38.300. The functions of the PDCP, RLC and MAC sublayers are listed respectively in sections 6.4, 6.3, and 6.2 of TS 38.300. The functions of the RRC layer are listed in sub-clause 7 of TS 38.300. The mentioned sections of TS 38.300 are incorporated herein by reference.

For instance, the Medium-Access-Control layer handles logical-channel multiplexing, and scheduling and scheduling-related functions, including handling of different numerologies.

For the physical layer, the MAC layer uses services in the form of transport channels. A transport channel can be defined by how and with what characteristics the information is transmitted over the radio interface. The Random-Access Channel (RACH) is also defined as a transport channel handled by MAC, although it does not carry transport blocks. One of procedures supported by the MAC layer is the Random Access Procedure.

The physical layer (PHY) is, for example, responsible for coding, PHY HARQ processing, modulation, multi-antenna processing, and mapping of the signal to the appropriate physical time-frequency resources. It also handles mapping of transport channels to physical channels. The physical layer provides services to the MAC layer in the form of transport channels. A physical channel corresponds to the set of time-frequency resources used for transmission of a particular transport channel, and each transport channel is mapped to a corresponding physical channel. One physical channel is the PRACH (Physical Random Access Channel) used for the random access.

Use cases/deployment scenarios for NR could include enhanced mobile broadband (eMBB), ultra-reliable low-latency communications (URLLC), massive machine type communication (mMTC), which have diverse requirements in terms of data rates, latency, and coverage. For example, eMBB is expected to support peak data rates (20 Gbps for downlink and 10 Gbps for uplink) and user-experienced data rates in the order of three times what is offered by IMT-Advanced. On the other hand, in case of URLLC, the tighter requirements are put on ultra-low latency (0.5 ms for UL and DL each for user plane latency) and high reliability (1-10$^5$ within 1 ms). Finally, mMTC may preferably require high connection density (1,000,000 devices/km$^2$ in an urban environment), large coverage in harsh environments, and extremely long-life battery for low cost devices (15 years).

Therefore, the OFDM numerology (e.g., subcarrier spacing, OFDM symbol duration, cyclic prefix (CP) duration, number of symbols per scheduling interval) that is suitable for one use case might not work well for another. For example, low-latency services may preferably require a shorter symbol duration (and thus larger subcarrier spacing) and/or fewer symbols per scheduling interval (aka, TTI) than an mMTC service. Furthermore, deployment scenarios with large channel delay spreads may preferably require a longer CP duration than scenarios with short delay spreads. The subcarrier spacing should be optimized accordingly to retain the similar CP overhead. NR may support more than one value of subcarrier spacing. Correspondingly, subcarrier spacing of 15 kHz, 30 kHz, 60 kHz . . . are being considered at the moment. The symbol duration $T_u$ and the subcarrier spacing $\Delta f$ are directly related through the formula $\Delta f=1/T_u$. In a similar manner as in LTE systems, the term "resource element" can be used to denote a minimum resource unit being composed of one subcarrier for the length of one OFDM/SC-FDMA symbol.

In the new radio system 5G-NR for each numerology and carrier a resource grid of subcarriers and OFDM symbols is defined respectively for uplink and downlink. Each element in the resource grid is called a resource element and is identified based on the frequency index in the frequency domain and the symbol position in the time domain (see 3GPP TS 38.211 v15.2.0 incorporated herein by reference).

Control Signaling PDCCH DCI Search Spaces

The main purpose of DCI (Downlink Control Information) in 5G NR is the same as DCI in LTE, namely being a special set of information that schedules a downlink data channel (e.g., the PDSCH) or an uplink data channel (e.g., PUSCH). In 5G NR there are a number of different DCI Formats defined (see, e.g., TS 38.212 v15.2.0 section 7.3.1 incorporated herein by reference). An overview is given by the following table.

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

PDCCH search spaces are areas in the downlink resource grid (time-frequency resources) where a PDCCH (DCI) may be carried. Put broadly, a radio resource region is used by a base station to transmit control information in the downlink to one or more UEs. The UE performs blind decoding throughout search space trying to find PDCCH data (DCI). Conceptually, the Search Space concept in 5G NR is similar to LTE Search Space, but there are many differences in terms of the details.

Synchronization Signal Block Measurement Timing Configuration SMTC—PSSSSS, PBCH

NR has introduced the so-called synchronization signal block, SS block (SSB), which comprises a Primary Synchronization Signal (PSS), a Secondary Synchronization Signal (SSS), and a Physical Broadcast CHannel (PBCH). The PSS and SSS can be used by UEs to find, synchronize to and identify a network. The PBCH carries a minimum amount of system information including an indication where the remaining broadcast system information is transmitted.

In LTE, these three signals were also used, the PSS, SSS, and PBCH, although not as being part of one SSB. The three SSB components are always transmitted together in NR, e.g., they have the same periodicity. A given SSB may be repeated within an SS burst set, which can be potentially used for a gNB beam-sweeping transmission. The SS burst set may be confined to a particular time period, such as a 5 ms window. For initial cell selection, the UE may assume a default SS burst set periodicity of 20 ms.

The 5G NR PSS is Physical Layer specific signal to identify the radio frame boundary and is type of an m-sequence. The 5G NR SSS is also a Physical-Layer specific signal to identify the subframe boundary and is also an m-sequence (see, e.g., TS 38.211 v15.2.0 section 7.4.2 incorporated herein by reference).

Reference Signals

As in LTE, several different types of reference signals (RS) are used for 5G NR (see 3GPP TS 38.211 v15.3.0 section 7.4.1 incorporated herein by reference). At least the following reference signals are available in 5G NR:

CSI-RS, Channel State Information Reference Signal, usable for channel state information acquisition and beam management PDSCH DMRS, DeModulation Reference Signal, usable for the PDSCH demodulation PDCCH DMRS, DeModulation Reference Signal, usable for the PDCCH demodulation PBCH DMRS, DeModulation Reference Signal, usable for the PBCH demodulation PTRS, Phase Tracking Reference Signal, usable for phase tracking the PDSCH, Tracking Reference Signal, usable for time tracking Further, PBCH DMRS can be exemplarily seen as part of the SSB-reference signals (see 3GPP TS 38.215 v15.3.0 section 5.1.1 "SS reference signal received power (SS-RSRP)").

The main differences between reference signals in 5G NR communication systems and reference signals in LTE are that in 5G NR, there is no Cell-specific reference signal, that a new reference signal PTRS has been introduced for time/phase tracking, that DMRS has been introduced for both downlink and uplink channels, and that in NR, the reference signals are transmitted only when it is necessary.

As a DL-only signal, the CSI-RS, which the UE receives, is used to estimate the channel and report channel quality information back to the gNB. During MIMO operations, NR may use different antenna approaches based on the carrier frequency. At lower frequencies, the system uses a modest number of active antennas for MU-MIMO and adds FDD operations. In this case, the UE may use the CSI-RS to calculate the CSI and report it back in the UL direction. The CSI-RS can be further characterized according to the following:

It is used for DL CSI acquisition.

Used for RSRP measurements during mobility and beam management

Also used for frequency/time tracking, demodulation and UL reciprocity based pre-coding CSI-RS is configured specific to UE, but multiple users can also share the same resource 5G NR standard allows high level of flexibility in CSI-RS configurations, a resource can be configured with up to 32 ports.

CSI-RS resource may start at any OFDM symbol of the slot and it usually occupies 1/2/4 OFDM symbols depending upon configured number of ports.

CSI-RS can be periodic, semi-persistent or aperiodic (due to DCI triggering)

For time/frequency tracking, CSI-RS can either be periodic or aperiodic. It is transmitted in bursts of two or four symbols which are spread across one or two slots Random Access Procedure Similar to LTE, 5G NR provides a RACH (Random Access Channel) procedure (or simply random access procedure). For instance, the RACH procedure can be used by the UE to access a cell it has found. The RACH procedure can also be used other contexts within NR, for example:

For handover, when synchronization is to be established to a new cell;
To reestablish uplink synchronization to the current cell if synchronization has been lost due to a too long period without any uplink transmission from the device;
To request uplink scheduling if no dedicated scheduling request resource has been configured for the device.

The RACH procedure will be described in the following in more detail, with reference to FIGS. 3 and 4. A mobile terminal can be scheduled for uplink transmission, if its uplink transmission is time synchronized. Therefore, the Random Access Channel (RACH) procedure plays a role as an interface between non-synchronized mobile terminals (UEs) and the orthogonal transmission of the uplink radio access. For instance, the Random Access is used to achieve uplink time synchronization for a user equipment which either has not yet acquired, or has lost, its uplink synchronization. Once a user equipment has achieved uplink synchronization, the base station can schedule uplink transmission resources for it. One scenario relevant for random access is where a user equipment in RRC_CONNECTED state, handing over from its current serving cell to a new target cell, performs the Random Access Procedure in order to achieve uplink time-synchronization in the target cell.

There can be two types of random access procedures allowing access to be either contention based, i.e., implying an inherent risk of collision, or contention free (non-contention based).

An exemplary definition of a random access procedure can be found in 3GPP TS 38.321, v15.3.0 section 5.1 incorporated herein by reference.

In the following, the contention-based random access procedure is being described in more detail with respect to FIG. 3. This procedure consists of four "steps." First, the user equipment transmits a random access preamble on the Physical Random Access Channel (PRACH) to the base station (i.e., message 1 of the RACH procedure). After the base station has detected a RACH preamble, it sends a Random Access Response (RAR) message (message 2 of the RACH procedure) on the PDSCH (Physical Downlink Shared Channel) addressed on the PDCCH with the (Random Access) RA-RNTI identifying the time-frequency and slot in which the preamble was detected. If multiple user equipment transmitted the same RACH preamble in the same PRACH resource, which is also referred to as collision, they would receive the same random access response message. The RAR message may convey the detected RACH preamble, a timing alignment command (TA command) for synchronization of subsequent uplink transmissions based on the timing of the received preamble, an initial uplink resource assignment (grant) for the transmission of the first scheduled transmission and an assignment of a Temporary Cell Radio Network Temporary Identifier (T-CRNTI). This T-CRNTI is used by base station to address the mobile(s) whose RACH preamble was detected until the RACH procedure is finished, since the "real" identity of the mobile at this point is not yet known by the base station.

The user equipment monitors the PDCCH for reception of the random access response message within a given time window (e.g., termed RAR reception window), which can be configured by the base station. In response to the RAR message received from the base station, the user equipment transmits the first scheduled uplink transmission on the radio resources assigned by the grant within the random access response. This scheduled uplink transmission conveys the actual random access procedure message like, for example, an RRC Connection Request, RRC Resume Request or a buffer status report.

In case of a preamble collision having occurred in the first message of the RACH procedure, i.e., multiple user equipment have sent the same preamble on the same PRACH resource, the colliding user equipment will receive the same T-CRNTI within the random access response and will also collide in the same uplink resources when transmitting their scheduled transmission in the third step of the RACH procedure. In case the scheduled transmission from one user equipment is successfully decoded by base station, the contention remains unsolved for the other user equipment (s). For resolution of this type of contention, the base station sends a contention resolution message (a fourth message) addressed to the C-RNTI or Temporary C-RNTI. This concludes the procedure.

Figure 4:
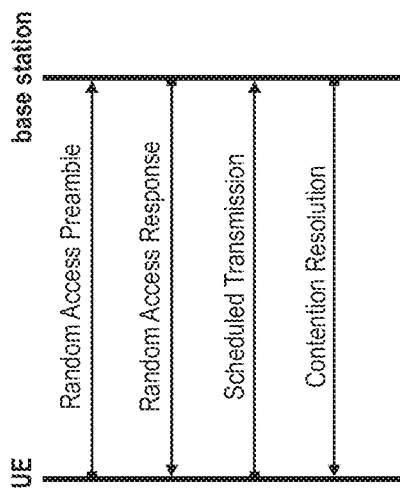
FIG. 4 illustrates the messages exchanged between an eNB and a UE when performing a contention-free RACH procedure.

FIG. 4 is illustrating the contention-free random access procedure, which is simplified in comparison to the contention-based random access procedure. The base station provides in a first step the user equipment with the preamble to use for random access so that there is no risk of collisions, i.e., multiple user equipment transmitting the same preamble. Accordingly, the user equipment is subsequently sending the preamble that was signaled by the base station in the uplink on a PRACH resource. Since the case that multiple UEs are sending the same preamble is avoided for a contention-free random access, essentially, a contention-free random access procedure is finished after having successfully received the random access response by the UE.

3GPP is also studying a two-step RACH procedure for 5G NR, where a message 1, that corresponds to messages 1 and 3 in the four-step RACH procedure, is transmitted at first. Then, the gNB will respond with a message 2, corresponding to messages 2 and 4 of the LTE RACH procedure. Due to the reduced message exchange, the latency of the two-step RACH procedure may be reduced compared to the four-step RACH procedure. The radio resources for the messages are optionally configured by the network.

According to one example, within a radio cell, random access preamble transmission can take place within a configurable subset of slots (the RACH slots), the subset repeating itself every RACH configuration period. Furthermore, within these RACH slots there may be multiple frequency-domain RACH occasions jointly covering K*M consecutive resource blocks, where M is the preamble bandwidth measured in number of resource blocks, and K is the number of frequency domain RACH occasions.

Exemplary implementations of the Random Access Preamble transmission as well as the Random Access Response reception are presented in the following (see 3GPP TS 38.321 v15.3.0 sections 5.1.3 and 5.1.4).

5.1.3 Random Access Preamble Transmission

The MAC entity shall, for each Random Access Preamble:

1> if PREAMBLE_TRANSMISSION_COUNTER is greater than one; and
1> if the notification of suspending power ramping counter has not been received from lower layers; and
1> if SSB selected is not changed (i.e., same as the previous Random Access Preamble transmission):
   2> increment PREAMBLE_POWER_RAMPING_COUNTER by 1.
1> select the value of DELTA PREAMBLE according to subclause 7.3;

1> set PREAMBLE_RECEIVED_TARGET_POWER to preambleReceivedTargetPower+DELTA_PREAMBLE+ (PREAMBLE_POWER_RAMPING_COUNTER−1)× PREAMBLE_POWER_RAMPING_STEP;
1> except for contention-free Random Access Preamble for beam failure recovery request, compute the RA-RNTI associated with the PRACH occasion in which the Random Access Preamble is transmitted;
1> instruct the physical layer to transmit the Random Access Preamble using the selected PRACH, corresponding RA-RNTI (if available), PREAMBLE INDEXand PREAMBLE RECEIVED TARGET POWER.

The RA-RNTI associated with the PRACH in which the Random Access Preamble is transmitted, is computed as:

$$RA\text{-}RNTI = 1 + s\_id + 14 \times t\_id + 14 \times 80 \times f\_id + 14 \times 80 \times 8 \times ul\_carrier\_id$$

where s_id is the index of the first OFDM symbol of the specified PRACH (0≤s_id<14), t_id is the index of the first slot of the specified PRACH in a system frame (0≤t_id<80), f_id is the index of the specified PRACH in the frequency domain (0≤f_id<8), and ul_carrier_id is the UL carrier used for Msg1 transmission (0 for NUL carrier, and 1 for SUL carrier).

5.1.4 Random Access Response Reception

Once the Random Access Preamble is transmitted and regardless of the possible occurrence of a measurement gap, the MAC entity shall:
1> if the contention-free Random Access Preamble for beam failure recovery request was transmitted by the MAC entity:
  2> start the ra-ResponseWindow configured in BeamFailureRecoveryConfig at the first PDCCH occasion as specified in TS 38.213 [6] from the end of the Random Access Preamble transmission;
  2> monitor the PDCCH of the SpCell for response to beam failure recovery request identified by the C-RNTI while ra-Response Window is running.
1> else:
  2> start the ra-ResponseWindow configured in RACH-ConfigCommon at the first PDCCH occasion as specified in TS 38.213 [6] from the end of the Random Access Preamble transmission;
  2> monitor the PDCCH of the SpCell for Random Access Response(s) identified by the RA-RNTI while the ra-Response Window is running.
1> if notification of a reception of a PDCCH transmission is received from lower layers on the Serving Cell where the preamble was transmitted; and
1> if PDCCH transmission is addressed to the C-RNTI; and
1> if the contention-free Random Access Preamble for beam failure recovery request was transmitted by the MAC entity:
  2> consider the Random Access procedure successfully completed.
1> else if a downlink assignment has been received on the PDCCH for the RA-RNTI and the received TB is successfully decoded:
  2> if the Random Access Response contains a MAC subPDU with Backoff Indicator:
    3> set the PREAMBLE BACKOFF to value of the BI field of the MAC subPDU using Table 7.2-1, multiplied with SCALING FACTOR BI.
  2> else:
    3> set the PREAMBLE BACKOFF to 0 ms.
  2> if the Random Access Response contains a MAC subPDU with Random Access Preamble identifier corresponding to the transmitted PREAMBLE_INDEX (see subclause 5.1.3):
    3> consider this Random Access Response reception successful.
  2> if the Random Access Response reception is considered successful:
    3> if the Random Access Response includes a MAC subPDU with RAPID only:
      4> consider this Random Access procedure successfully completed;
      4> indicate the reception of an acknowledgement for SI request to upper layers.
    3> else:
      4> apply the following actions for the Serving Cell where the Random Access Preamble was transmitted:
        5> process the received Timing Advance Command (see subclause 5.2);
        5> indicate the preambleReceivedTargetPower and the amount of power ramping applied to the latest Random Access Preamble transmission to lower layers (i.e., (PREAMBLE_POWER_RAMPING_COUNTER−1)×PREAMBLE_POWER_RAMPING_STEP);
        5> if the Serving Cell for the Random Access procedure is SRS-only SCell:
          6> ignore the received UL grant.
        5> else:
          6> process the received UL grant value and indicate it to the lower layers.
      4> if the Random Access Preamble was not selected by the MAC entity among the contention-based Random Access Preamble(s):
        5> consider the Random Access procedure successfully completed.
      4> else:
        5> set the TEMPORARY C-RNTI to the value received in the Random Access Response;
        5> if this is the first successfully received Random Access Response within this Random Access procedure:
          6> if the transmission is not being made for the CCCH logical channel:
            7> indicate to the Multiplexing and assembly entity to include a C-RNTI MAC CE in the subsequent uplink transmission.
          6> obtain the MAC PDU to transmit from the Multiplexing and assembly entity and store it in the Msg3 buffer.
1> if ra-ResponseWindow configured in RACH-ConfigCommon expires, and if the Random Access Response containing Random Access Preamble identifiers that matches the transmitted PREAMBLE INDEXhas not been received; or
1> if ra-ResponseWindow configured in BeamFailureRecoveryConfig expires and if the PDCCH addressed to the C-RNTI has not been received on the Serving Cell where the preamble was transmitted:
  2> consider the Random Access Response reception not successful;
  2> increment PREAMBLE_TRANSMISSION_COUNTER by 1;
  2> if PREAMBLE_TRANSMISSION_COUNTER=pream-bleTransMax+1:

3> if the Random Access Preamble is transmitted on the SpCell:
    4> indicate a Random Access problem to upper layers;
    4> if this Random Access procedure was triggered for SI request:
        5> consider the Random Access procedure unsuccessfully completed.
3> else if the Random Access Preamble is transmitted on a SCell:
    4> consider the Random Access procedure unsuccessfully completed.
2> if the Random Access procedure is not completed:
    3> select a random backoff time according to a uniform distribution between 0 and the PREAMBLE_BACKOFF;
    3> if the criteria (as defined in subclause 5.1.2) to select contention-free Random Access Resources is met during the backoff time:
        4> perform the Random Access Resource selection procedure (see subclause 5.1.2);
    3> else:
        4> perform the Random Access Resource selection procedure (see subclause 5.1.2) after the backoff time.

The MAC entity may stop ra-ResponseWindow (and hence monitoring for Random Access Response(s)) after successful reception of a Random Access Response containing Random Access Preamble identifiers that matches the transmitted PREAMBLE INDEX.

HARQ operation is not applicable to the Random Access Response transmission.

Cell Reselection

The purpose of mobility mechanism in idle and inactive status to ensure that the device is reachable by the network. The network does this by notifying the device by means of a paging message. The area over which such a paging message is transmitted is a key aspect of the paging mechanism, and in idle and inactive notes, the device is in control of when to update this information. This is sometimes referred to as Cell reselection (see 3GPP TS 38.304 v 15.1.0, section 5.2 incorporated herein by reference).

In essence, the device searches for and measures on candidate cells similar to the initial cell search. Once a device discovers a cell with a received power sufficiently higher than the current one, it considered this as the best cell, and, if necessary, contacts the network through random access.

NR-Unlicensed

The reason for extending LTE to unlicensed bands is the ever-growing demand for wireless broadband data in conjunction with the limited amount of licensed bands. The unlicensed spectrum therefore is more and more considered by cellular operators as a complementary tool to augment their service offering. The advantage of LTE in unlicensed bands compared to relying on other radio access technologies (RAT) such as Wi-Fi is that complementing the LTE platform with unlicensed spectrum access enables operators and vendors to leverage the existing or planned investments in LTE/EPC hardware in the radio and core network.

However, it has to be taken into account that unlicensed spectrum access can never match the qualities of licensed spectrum access due to the inevitable coexistence with other radio access technologies (RATs) in the unlicensed spectrum such as Wi-Fi. LTE operation on unlicensed bands was therefore at least in the beginning considered a complement to LTE on licensed spectrum rather than as stand-alone operation on unlicensed spectrum. Based on this assumption, 3GPP established the term Licensed Assisted Access (LAA) for the LTE operation on unlicensed bands in conjunction with at least one licensed band. Future stand-alone operation of LTE on unlicensed spectrum, i.e., without being assisted by licensed cells, however shall not be excluded, and such a stand-alone unlicensed operation is now foreseen for 5G NR.

The currently-intended general LAA approach at 3GPP is to make use of the already specified Rel-12 carrier aggregation (CA) framework as much as possible, where the CA framework configuration as explained before comprises a so-called primary cell (PCell) carrier and one or more secondary cell (SCell) carriers. CA supports in general both self-scheduling of cells (scheduling information and user data are transmitted on the same component carrier) and cross-carrier scheduling between cells (scheduling information in terms of PDCCH/EPDCCH and user data in terms of PDSCH/PUSCH are transmitted on different component carriers).

Usage of the unlicensed bands has also become a focus for the new 5G-NR development. The NR licensed design can be used as the baseline, and deployment scenarios such as the following can be considered:

Carrier aggregation between the NR licensed cell (e.g., PCell) and NR unlicensed cell (e.g., SCell) similar to LTE LAA Dual Connectivity (with LTE and with NR); ENU-DC in which the master eNB operates in licensed spectrum and secondary gNB operates in unlicensed spectrum; NNU-DC in which the master NB operates in licensed spectrum and the secondary gNB operates in unlicensed spectrum Stand-Alone (SA): NR-U SA, in which a standalone NR PCell operates in the unlicensed spectrum An NR radio cell with Downlink in unlicensed band and UL in licensed band In NR, Listen-Before-Talk, is to be performed on unlicensed carriers. In particular, transmitting entities perform LBT, and channel occupation is only allowed after a successful LBT Clear Channel Assessment (CCA).

Figure 5:
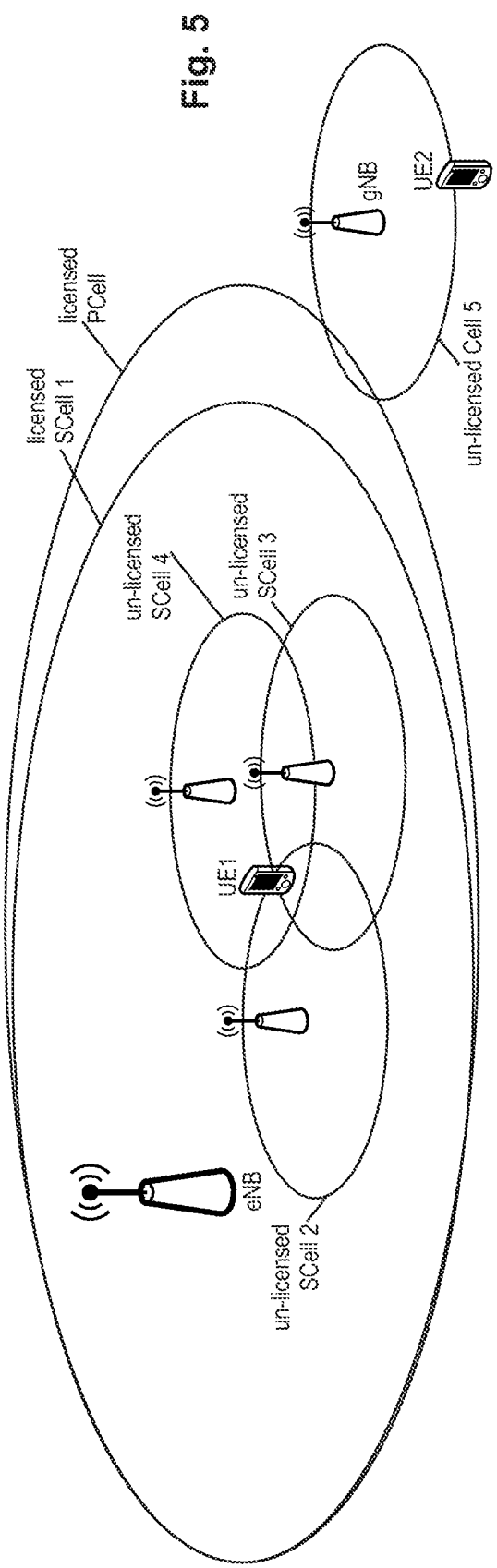
FIG. 5 illustrates an exemplary LAA scenario with several licensed und unlicensed cells.

A very simple scenario is illustrated in FIG. 5, with a licensed PCell, licensed SCell 1, and various unlicensed SCells 2, 3, and 4 (exemplarily depicted as small cells). The transmission/reception network nodes of unlicensed SCells 2, 3, and 4 could be remote radio heads managed by the eNB or could be nodes that are attached to the network but not managed by the eNB. For simplicity, the connection of these nodes to the eNB or to the network is not explicitly shown in the figure. Furthermore, unlicensed radio cell 5 illustrates a stand-alone scenario of an NR PCell that operates in the unlicensed spectrum.

One of the most critical issues is the coexistence with other systems, such as Wi-Fi (IEEE 802.11) systems operating at these unlicensed bands. In order to support fair coexistence between LTE, 5G NR and other technologies such as Wi-Fi, as well as to guarantee fairness between different operators in the same unlicensed band, the channel access for unlicensed bands has to abide by certain sets of regulatory rules which partly may depend on the geographical region and particular frequency band (see, e.g., 3GPP Technical Report TR 36.889, version 13.0.0). Depending on region and band, regulatory requirements that have to be taken into account when designing LAA and 5G NR procedures comprise Dynamic Frequency Selection (DFS), Transmit Power Control (TPC), Listen Before Talk (LBT) and discontinuous transmission with limited maximum transmission duration (may also be termed channel occupancy time, or channel acquisition time). A single global framework can be targeted which basically means that all requirements for different regions and bands at 5 GHz can be taken into account for the system design.

The listen-before-talk (LBT) procedure is defined as a mechanism by which a device applies a clear channel assessment (CCA) check before using the channel. According to one exemplary implementation, the CCA utilizes at least energy detection to determine the presence or absence of other signals on an unlicensed channel in order to determine if a channel is occupied or clear, respectively. European and Japanese regulations for instance mandate the usage of LBT in the unlicensed bands. Apart from regulatory requirements, this carrier sensing via LBT is one way for fair sharing of the unlicensed spectrum and is thus considered to be a vital feature for fair and friendly operation in the unlicensed spectrum in a single global solution framework.

In the unlicensed spectrum, the channel availability cannot always be guaranteed. In addition, certain regions such as Europe and Japan prohibit continuous transmissions and impose limits on the maximum duration of a transmission burst in the unlicensed spectrum (maximum channel occupancy). Hence, discontinuous transmission with limited maximum transmission duration is a functionality for LAA and 5G NR.

Following this European regulation regarding LBT, devices have to perform a clear channel Assessment (CCA) before occupying the radio channel with a data transmission. In such restricted exemplary scenarios, it is only allowed to initiate a transmission on the unlicensed channel after detecting the channel as free based, e.g., on energy detection. In particular, the equipment has to observe the channel for a certain minimum time (e.g., for Europe 20 s, see ETSI 301 893, clause 4.8.3) during the CCA. The channel is considered occupied if the detected energy level exceeds a configured CCA threshold (e.g., for Europe, −73 dBm/MHz, see ETSI 301 893, clause 4.8.3), and conversely is considered to be free if the detected power level is below the configured CCA threshold. If the channel is determined as being occupied, it shall not transmit on that channel during the next Fixed Frame Period. If the channel is classified as free, the equipment is allowed to transmit immediately. The maximum transmit duration is restricted in order to facilitate fair resource sharing with other devices operating on the same band.

The CCA can be performed repeatedly, optionally with a backoff time in between.

The energy detection for the CCA can be performed over the whole channel bandwidth (e.g., 20 MHz in unlicensed bands at 5 GHz), which means that the reception power levels of all subcarriers of an LTE OFDM symbol within that channel contribute to the evaluated energy level at the device that performed the CCA.

Furthermore, the total time during which an equipment has transmissions on a given carrier without re-evaluating the availability of that carrier (i.e., LBT/CCA) is defined as the channel occupancy time (see, e.g., ETSI 301 893, clause 4.8.3.1). The channel occupancy time shall be in the range of 1 ms to 10 ms, where the maximum channel occupancy time could be, e.g., 4 ms as currently defined for Europe. Furthermore, there is a minimum Idle time the UE is not allowed to transmit after a transmission on the unlicensed cell, the minimum Idle time being at least 5% of the channel occupancy time. Towards the end of the Idle Period, the UE can perform a new CCA, and so on.

Moreover, the CCA may not be required within a specific time period after receiving a signal by another entity, e.g., within 16 microseconds, as part of a shared COT.

For instance, switching between DL and UL, and between UL and DL, within a shared gNB COT, does not require LBT.

Figure 6:
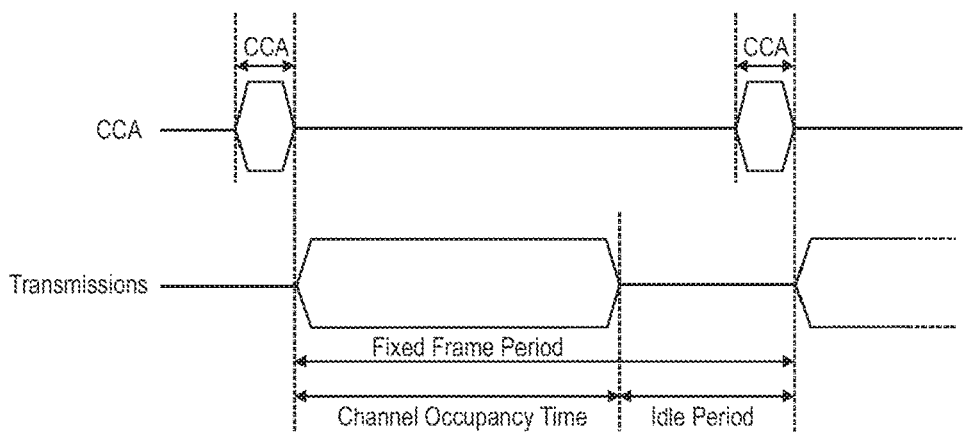
FIG. 6 illustrates the transmission behavior for an LAA transmission.

This transmission behavior is schematically illustrated in FIG. 6 (see, e.g., ETSI EN 301 893).

Consequently, the operation on unlicensed radio cells requires any transmitter to perform Listen-Before-Talk as described above. This is also applied to the random access procedure, for example, to the transmission of the random access preamble of the RACH procedure.

As has been explained before, the random access procedure can exemplarily comprise four steps, the first step being the transmission of the random access preamble. The RACH procedure is handled by the MAC layer, using services of the PHY layer. In more detail, when initiating the random access procedure, the MAC layer (for example, one MAC entity of the MAC layer) can perform the following exemplary steps:

1. UE MAC entity instructs the UE PHY entity to transmit a preamble
   a. UE MAC entity sets a preamble transmission counter (PREAMBLE_TRANSMISSION_COUNTER) to 1 and starts a random access response reception window
2. UE PHY entity tries to transmit a preamble over a corresponding PRACH resource of the radio cell (which is informed by MAC)
3. UE MAC entity monitors for a corresponding random access response reception even if the preamble transmission is not performed in the UE physical layer (e.g., due to some conflict with the measurement gap).
   a. UE MAC entity starts the RAR reception window to monitor for the reception of the random access response (msg2) from the gNB. The RA-RNTI (Random Access RNTI) is associated with the PRACH in which the random access preamble is transmitted.
4. If the preamble transmission is dropped in the UE physical entity for some reason, then the UE MAC entity can only perform the transmission of the random access preamble again in the next available PRACH location after the RAR reception window.

Figure 7:
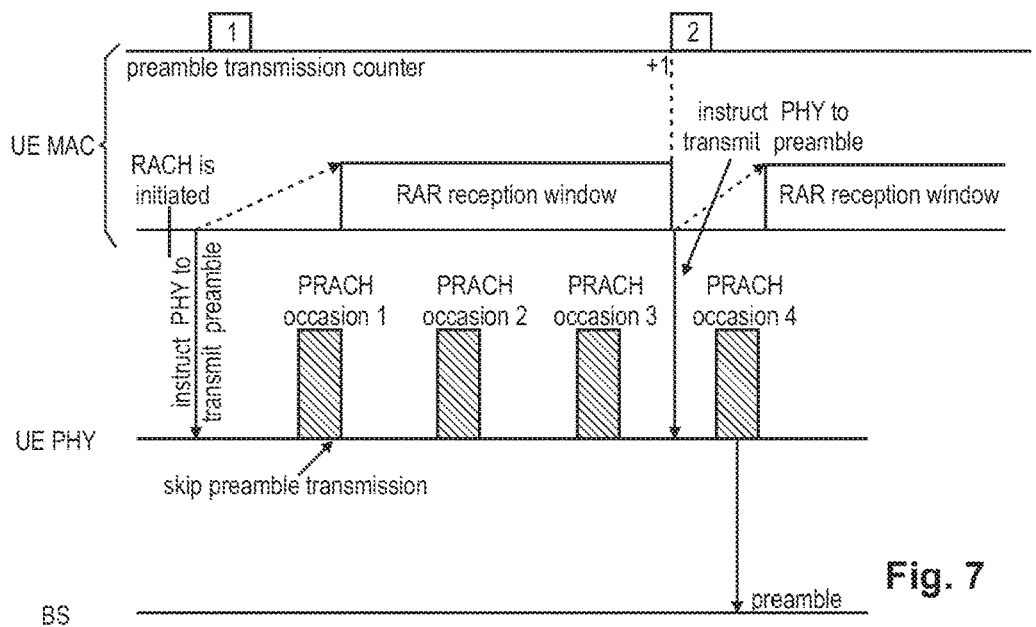
FIG. 7 illustrates the operation of the MAC and physical layer of the UE and the base station for the transmission of a random access preamble of a random access procedure.

An exemplary and simplified illustration of this sequence of the random access preamble transmission is provided in FIG. 7. As apparent therefrom, it is exemplarily assumed that the first preamble transmission at PRACH occasion 1 is skipped (for some reason, such as measurement gap conflict). A retransmission of the preamble on the other hand takes place after the RAR reception window expires, not before. In the exemplary scenario of FIG. 7, the UE is able to transmit the preamble at PRACH occasion 4, after the expiry of the initially started RAR reception window. This increases the delay of the random access procedure.

The preamble transmission counter is further monitored as to whether it increases too much, e.g., up to a particular preamble transmission threshold. If the threshold is reached, the UE MAC entity can indicate a random access problem to an upper layer (higher layer such as the RRC which in turn can perform, e.g., cell reselection.

This scenario explained in connection with FIG. 7 is particularly relevant for the unlicensed frequency scenarios, in which the transmission of the random access preamble may be further restricted by the LBT constraints to be complied with in the unlicensed frequency spectrum. For instance, the UE typically will have to check whether the unlicensed radio channel is clear (e.g., clear channel assessment, CCA, of the LBT) before transmitting the random access preamble to its serving base station. In case the channel is clear, the UE PHY will transmit the random access preamble. However, in case the channel is not clear, the UE PHY will not transmit the random access preamble.

As already explained with regard to FIG. 7, the retransmission of the random access preamble will be performed after expiry of the initially started RAR reception window.

Moreover, if the unlicensed radio cell is again too congested, the UE may not be even able to retransmit the random access preamble in other PRACH occasions.

Moreover, in such cases where the UE physical layer entity continuously experiences LBT failures due to the channel being too busy, the UE may waste a lot of time on trying to retransmit the random access preamble, before actually declaring a radio link problem to the upper layers (e.g., after the random access preamble counter reaches its maximum).

There could be, e.g., two cases. In one case, the UE does not increase the preamble transmission counter, if the PHY layer dropped a preamble transmission because of LBT. In that case however, if channel is too busy, then UE MAC may hardly reach maximum counter. As a result, UE may waste a lot of time on trying to retransmit the random access preamble, before actually declaring a radio link problem to the upper layers In a second case, the UE increases the preamble transmission counter if the PHY layer dropped a preamble transmission because of LBT. In that case however, if channel is too busy, then the physical layer may experiences LBT fails continuously. Hence, UE MAC may reach maximum counter very quickly. As a result, UE MAC will report random access problem to higher layer very early.

Consequently, the inventors have identified the possibility to adapt the random access procedure to unlicensed scenarios, such as the 5G NR-U communication systems, but optionally also the unlicensed operation in LTE-(A) communication systems.

Moreover, the operation on unlicensed radio cells requires any transmitter to perform Listen-Before-Talk as described above. As identified by the inventors, this LBT requirement has thus to be applied to a variety of mechanism, which thus creates new challenges for mobility-related mechanisms such as the cell reselection. For example, there is no point for the UE to stay within a same unlicensed radio cell when the preamble transmissions repeatedly fail.

The inventors have recognized these problems in connection with how cell reselection and random access procedures are performed by the UE and recognized the need for defining an improve procedures in said respect, not exclusively but mainly when performing such procedures on unlicensed frequency carriers.

In the following, UEs, base stations, and procedures to meet these needs will be described for the new radio access technology envisioned for the 5G mobile communication systems, but which may also be used in LTE mobile communication system. Different implementations and variants will be explained as well. The following disclosure was facilitated by the discussions and findings as described above and may, for example, be based at least on part thereof.

In general, it should be noted that many assumptions have been made herein so as to be able to explain the principles underlying the present disclosure in a clear and understandable manner. These assumptions are however to be understood as merely examples made herein for illustration purposes that should not limit the scope of the disclosure. A skilled person will be aware that the principles of the following disclosure and as laid out in the claims can be applied to different scenarios and in ways that are not explicitly described herein.

Moreover, some of the terms of the procedures, entities, layers etc. used in the following are closely related to LTE/LTE-A systems or to terminology used in the current 3GPP 5G standardization, even though specific terminology to be used in the context of the new radio access technology for the next 3GPP 5G communication systems is not fully decided yet. Thus, terms could be changed in the future, without affecting the functioning of the embodiments. Consequently, a skilled person is aware that the embodiments and their scope of protection should not be restricted to particular terms exemplarily used herein for lack of newer or finally agreed terminology but should be more broadly understood in terms of functions and concepts that underlie the functioning and principles of the present disclosure.

For instance, a mobile station or mobile node or user terminal or user equipment (UE) is a physical entity (physical node) within a communication network. One node may have several functional entities. A functional entity refers to a software or hardware module that implements and/or offers a predetermined set of functions to other functional entities of the same or another node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

The term "base station" or "radio base station" here refers to a physical entity within a communication network. As with the mobile station, the base station may have several functional entities. A functional entity refers to a software or hardware module that implements and/or offers a predetermined set of functions to other functional entities of the same or another node or the network. The physical entity performs some control tasks with respect to the communication device, including one or more of scheduling and configuration. It is noted that the base station functionality and the communication device functionality may be also integrated within a single device. For instance, a mobile terminal may implement also functionality of a base station for other terminals. The terminology used in LTE is eNB (or eNodeB), while the currently used terminology for 5G NR is gNB.

Figure 8:
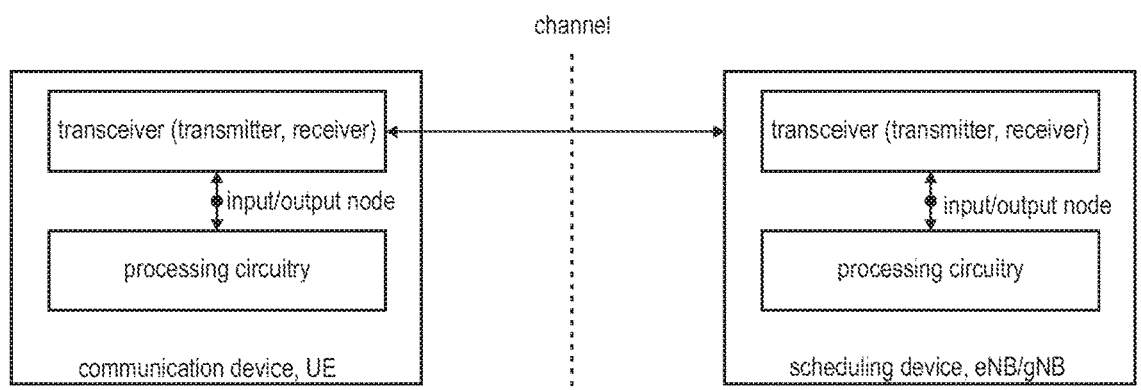
FIG. 8 illustrates the exemplary and simplified structure of a UE and a gNB.

FIG. 8 illustrates a general, simplified and exemplary block diagram of a user equipment (also termed communication device) and a scheduling device (here exemplarily assumed to be located in the base station, e.g., the eLTE eNB (alternatively termed ng-eNB) or the gNB in 5G NR). The UE and eNB/gNB are communicating with each other over a (wireless) physical channel respectively using the transceiver.

The communication device may comprise a transceiver and processing circuitry. The transceiver in turn may comprise and/or function as a receiver and a transmitter. The processing circuitry may be one or more pieces of hardware such as one or more processors or any LSIs. Between the transceiver and the processing circuitry there is an input/output point (or node) over which the processing circuitry, when in operation, can control the transceiver, i.e., control the receiver and/or the transmitter and exchange reception/transmission data. The transceiver, as the transmitter and receiver, may include the RF (radio frequency) front including one or more antennas, amplifiers, RF modulators/demodulators and the like. The processing circuitry may implement control tasks such as controlling the transceiver to transmit user data and control data provided by the processing circuitry and/or receive user data and control data, which is further processed by the processing circuitry. The processing circuitry may also be responsible for performing other processes such as determining, deciding, calculating, measuring, etc. The transmitter may be responsible for performing the process of transmitting and other processes related thereto. The receiver may be responsible for performing the process of receiving and other processes related thereto, such as monitoring a channel.

The solutions offered in the following will be described mainly in connection with the 5G NR standardization for the unlicensed operation (e.g., standalone or dual connectivity). Nevertheless, as already hinted at above, the present concepts, ideas and improvements are not restricted to 5G NR Unlicensed standardization but are equally applicable to the licensed operation of 5G NR and also to the unlicensed and/or licensed operation in LTE-(A) communication systems. Also future communication systems may benefit from the concepts disclosed herein.

Embodiment 1—Improved Cell Reselection Procedure

A first embodiment will be described in the following with regard to FIGS. 9 and 10.

Figure 9:
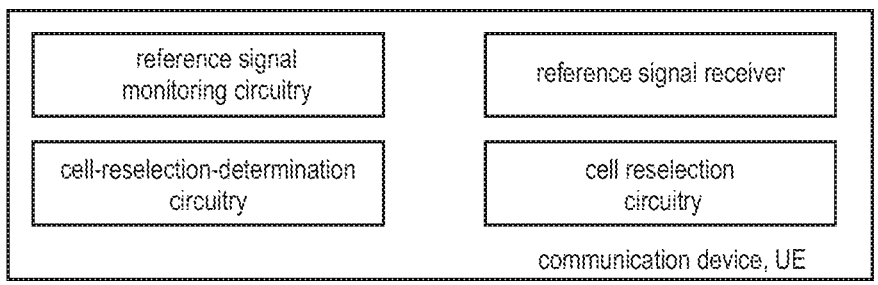
FIG. 9 illustrates a structure of the UE according to an exemplary implementation of a first embodiment.

FIG. 9 illustrates a simplified and exemplary UE structure according to the present solution and can be implemented based on the general UE structure explained in connection with FIG. 8 above. The various structural elements of the UE illustrated in said figure can be interconnected between one another, e.g., with corresponding input/output nodes (not shown), e.g., in order to exchange control and user data and other signals. Although not shown for illustration purposes, the UE may include further structural elements.

As apparent therefrom, the UE may include a reference signal receiver, a reference signal monitoring circuitry, a cell-reselection-determination circuitry, as well as a cell-reselection circuitry in order to participate in the improved procedures for performing a cell reselection as will be explained in the following.

In the present case as will become apparent from the below disclosure, the processor can thus be exemplarily configured to at least partly perform one or more of the following steps of monitoring for the reception of reception signals to determine a continuous number of reference signals that are missing, of determining whether to perform cell reselection or not, and of selecting another radio cell during the cell reselection.

The receiver can in turn be configured to be able to at least partly perform one or more of the following steps of receiving the reference signals, and of receiving information on the threshold values via system information or configuration messages (such as of the RRC protocol).

A simplified NR-Unlicensed scenario is exemplarily assumed in the following, an example of which is illustrated in FIG. 4, showing various NR-Unlicensed radio cells served by respective gNBs.

Figure 10:
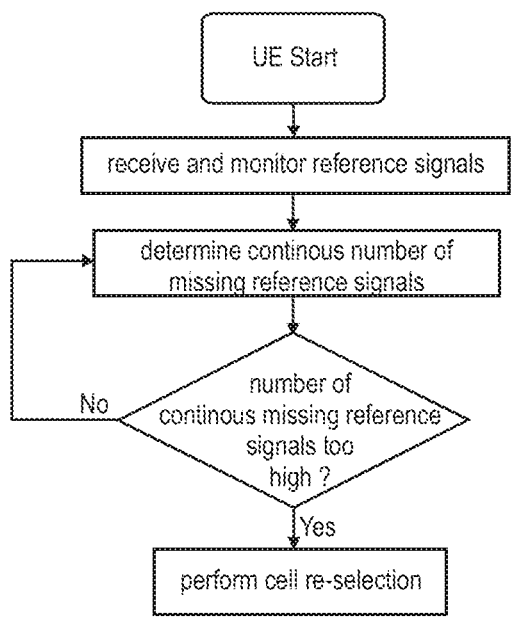
FIG. 10 is a flow diagram for the behavior of a UE, according to an exemplary implementation of the first embodiment.

FIG. 10 is a sequence diagram for the UE behavior according to this improved cell reselection procedure.

It is exemplarily assumed that the UE is in an idle mode, but it is also possible that the UE is in a connected mode. Further, it is assumed that the UE is configured to receive reference signals from the radio cell it is currently camping on and optionally also from other neighboring radio cells. In one example, the radio cell the UE is currently camping on (exemplarily termed in the following serving radio cell, controlled by a serving base station) is an unlicensed radio cell.

Typically, the UE is configured with regard to which reference signals it can monitor and at which resources these respective reference signals can be expected by the UE. The UE can thus receive the reference signals as well as determine whether reference signals are missing or not. For instance, a reference signal can be missing altogether, for example, because the corresponding base station was not able to send out the reference signal (e.g., can be termed missing reference signals). One reason for the serving base station to not send out a reference signal is that the base station could not previously acquire the unlicensed radio channel because of the LBT requirements (e.g., clear channel assessment was negative due to other signals blocking the unlicensed carrier) to be complied with on the unlicensed frequency spectrum.

The UE is able to determine missing reference signals (that should have been received from the base station, that are expected based on the configured reference signals) and on that basis determines how many reference signals are continuously missing (i.e., the number of reference signals that are continuously missing).

This determined number of reference signals that are continuously missing can then be compared by the UE to a particular threshold in order to determine whether to perform cell reselection or not. In case the determined number of continuously missing reference signals reaches a certain threshold (e.g., is equal to the threshold, or is equal to or higher than the threshold), then the UE may decide to perform cell reselection from the current unlicensed serving radio cell to another radio cell. The other radio cell has a different frequency than the unlicensed serving radio cell, so as to avoid the same LBT-related problems as encountered with the current serving radio cell. The different frequency may be a licensed radio frequency or an unlicensed radio frequency.

The UE is aware of other radio cells in its vicinity for instance based on radio cell measurements that are regularly performed by the UE, for instance intra-frequency measurements or inter-frequency measurements or inter-RAT (radio access technology) measurements.

The reference signals to be used in such an exemplary 5G NR implementation can be, e.g., the CSI-RS and/or the SSB signals. The UE in RRC idle will be typically instructed to monitor the SSB reference signal, but not the CSI-RS, because the CSI-RS may be beam-formed into a narrow beam and thus may not reach the UE.

According to one implementation, there is a fixed configuration of how and which reference signals the UE shall use for determining the number of continuously missing reference signals. For instance, this can be done by providing corresponding indications via a 3GPP specification, or via a network operator configuration in the USIM of a UE.

According to another implementation of this improved cell reselection procedure, which reference signal the UE shall use for determining the number of continuously missing reference signals can be configured and updated by the serving base station. For instance, the UE may be instructed to only use the SSB reference signals, in which case any missing or received CSI-RS are disregarded for this improved cell reselection procedure, i.e., these do not increase or interrupt the continuously missing reference signals. According to another option, the UE may be instructed to use both the SSB reference signal as well as the CSI-RS, such that the continuously missing reference signals encompass both the SSB as well as the CSI-RS.

This may be done by the serving base station by providing suitable information, e.g., via system information in its radio cell. Correspondingly, the system information carries this information, which can be, e.g., read by all UEs in the radio cell. There can be also other options to carry this reference signal configuration information to one or more of the UEs in the unlicensed radio cell, such as messages of the RRC protocol.

In one exemplary implementation, the configuration of which reference signals to use can be similarly implemented as the configuration in connected mode RLM (Radio Link Monitoring) broadcast in the system information message (see 3GPP TS 38.331 section 6.3.3, MeasAndMobParameters, incorporated herein by reference). For instance, a supported gap pattern parameter can be defined having 2 bits to differentiate between the three different options, CSI-RS, SSB-RS, or CSI-RS and SSB-RS.

Furthermore, the UE can be configured with the appropriate value of the maximum threshold that the number of continuously missing reference signals can reach for determining that cell reselection is to be performed. This may be done by the serving base station for instance by providing the suitable information via system information in its radio cell. There can be also other options to provide this maximum threshold value to the UE, such as based on a configuration message of the RRC protocol.

The value of the maximum threshold can be determined by the base station, taking the characteristics of the UE into account, such as the services supported by the UE or the latency required by the UE (latency may also depend on the service and deployment scenario, e.g., URLLC). For instance, a UE supporting ultra-reliable and low-latency communications (URLLC) can be configured by the gNB with a smaller threshold value, in order to more quickly reselect a new cell and thus avoid any unnecessary delays. The gNB can thus reach the UE more quickly (even more if the new cell is a licensed cell), e.g., for providing pending downlink data to the UE, involving the transmission of a paging message.

On the other hand, a UE supporting the enhanced mobile broadband (eMBB) (i.e., low-priority traffic) can be configured with a larger value of the reference signal threshold since it can tolerate a longer delay. Even if downlink data is pending at the base station, the base station can wait longer with paging the UE.

According to one exemplary implementation, the current cell reselection procedure defined for 5G can be extended based on the above-described improvements (see 3GPP TS 38.304 v15.1.0, sections 5.2.4.5 and 5.2.4.6 incorporated herein by reference). In particular, these sections 5.2.4.5 and 5.2.4.6 can be extended to include the following exemplary instruction:

"The UE shall reselect the new cell, if the following condition is met:

If UE detects N consecutively missing reference signals in the serving cell."

Overall, one benefit that the improved cell reselection procedure facilitates is that the UE can trigger the cell reselection procedure earlier, depending on the congestion of the unlicensed radio channel. The cell reselection procedure of the prior art does not take the congestion level of the unlicensed radio cell into account as a parameter to trigger selecting another cell.

Embodiment 2—Improved Random Access Procedures

Various different variants of a second embodiment will be described in the following.

A simplified NR-Unlicensed scenario is exemplarily assumed in the following, an example of which is illustrated in FIG. 4, showing various NR-Unlicensed radio cells served by respective gNBs as well as UEs being located in these unlicensed radio cell. It can be assumed that one of these UEs is camping on or is connected to a gNB of an unlicensed radio cell. It is exemplarily assumed that a random access procedure is triggered in the user equipment for any suitable reason (such as Initial access from RRC_IDLE; RRC Connection Re-establishment procedure; Handover; DL or UL data arrival during RRC_CONNECTED when UL synchronization status is "non-synchronized"; Transition from RRC_INACTIVE; Request for Other SI; Beam failure recovery). Although the following will be described in connection with a 4-step random access procedure as illustrated and explained with reference to FIGS. 3 and 4, the following can be applied accordingly as well to a 2-step random access procedure as mentioned before.

One exemplary implementation of the second embodiment is presented in the following. A corresponding exemplary implementation based on the following principles will be explained based on the illustration in FIGS. 11, 12, 13 and 14.

In order to speed up the random access procedure in unlicensed scenarios, the improved random access procedure introduces an LBT failure notification from the physical layer to the MAC layer of the user equipment, which informs the MAC layer that the preamble could not be transmitted by the physical layer because the channel is not clear (i.e., LBT failed). Upon receiving that LBT failure notification, the MAC layer can immediately proceed to repeat the preamble transmission, without having to wait to the expiry of a random access response reception window started for the first unsuccessful preamble transmission attempt.

Moreover, in order to be able to quickly inform upper layers about a random access problem that is the result of these LBT failures, the MAC layer is enabled to operate numerous random access response reception windows at the same time, particularly one window for each preamble transmission attempt (be it successful or unsuccessful). These are numerous windows respectively result in an increase of the preamble transmission counter, which, upon reaching a maximum, triggers the reporting of a random access problem.

Figure 11:
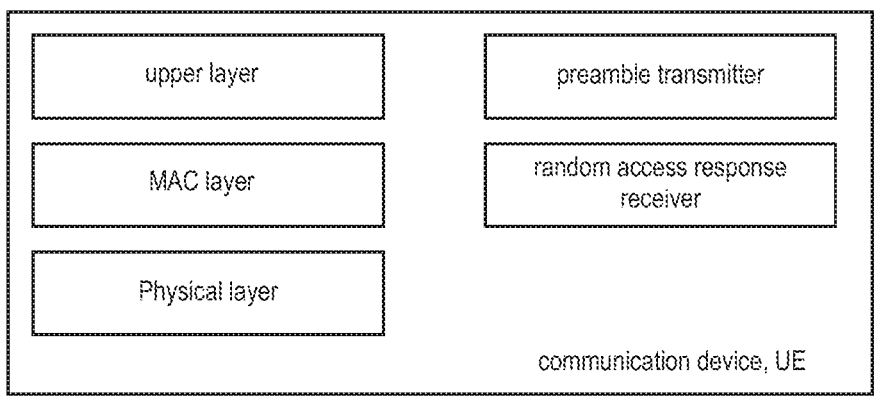
FIG. 11 illustrates a structure of the UE according to an exemplary implementation of a second embodiment.

FIG. 11 illustrates a simplified and exemplary UE structure according to the present solution and can be implemented based on the general UE structure explained in connection with FIG. 8 above. The various structural elements of the UE illustrated in said figure can be interconnected between one another, e.g., with corresponding input/output nodes (not shown), e.g., in order to exchange control and user data and other signals. Although not shown for illustration purposes, the UE may include further structural elements.

As apparent therefrom, the UE may include an upper layer (could be more than one), a MAC layer (or MAC layer entity), a Physical layer (or Physical layer entity), a preamble transmitter as well as a random access response receiver in order to participate in the improved procedures for performing a random access as will be explained in the following.

In the present case as will become apparent from the below disclosure of the different embodiments and variants thereof, the processor can thus be exemplarily configured to at least partly perform one or more of the following steps of initiating a random access procedure, operating the MAC layer as well as the physical layer, of operating a random access response reception window, of determining whether or not an unlicensed radio channel is clear, of exchanging instructions and notifications between the MAC layer and the physical layer, of operating a preamble transmission counter, and of informing upper layers of the UE about a random access failure.

The transmitter can in turn be configured to be able to at least partly transmit messages of the random access procedure, such as the random access preamble. The receiver can in turn be configured to be able to at least partly perform one or more of the following steps of receiving reference signals, of receiving configuration information via system information or configuration messages (such as of the RRC protocol), of receiving a random access response message from the serving base station.

Figure 12:
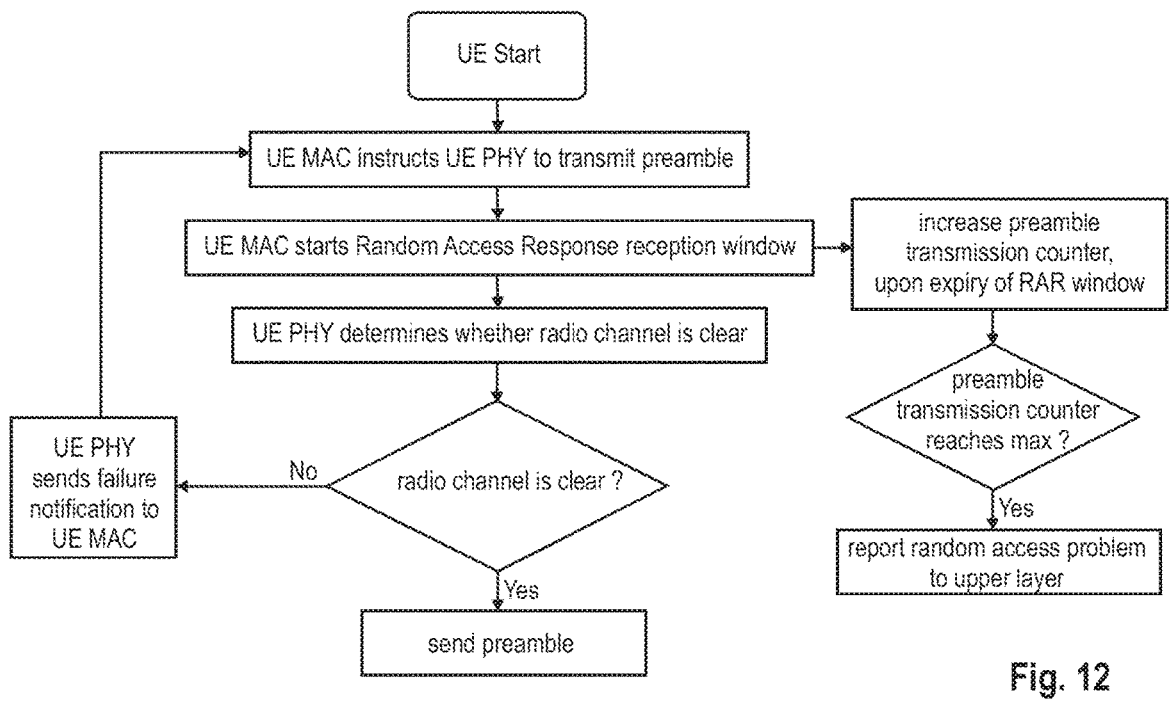
FIG. 12 is a flow diagram for the behavior of a UE, according to an exemplary implementation of the second embodiment.
Figure 13:
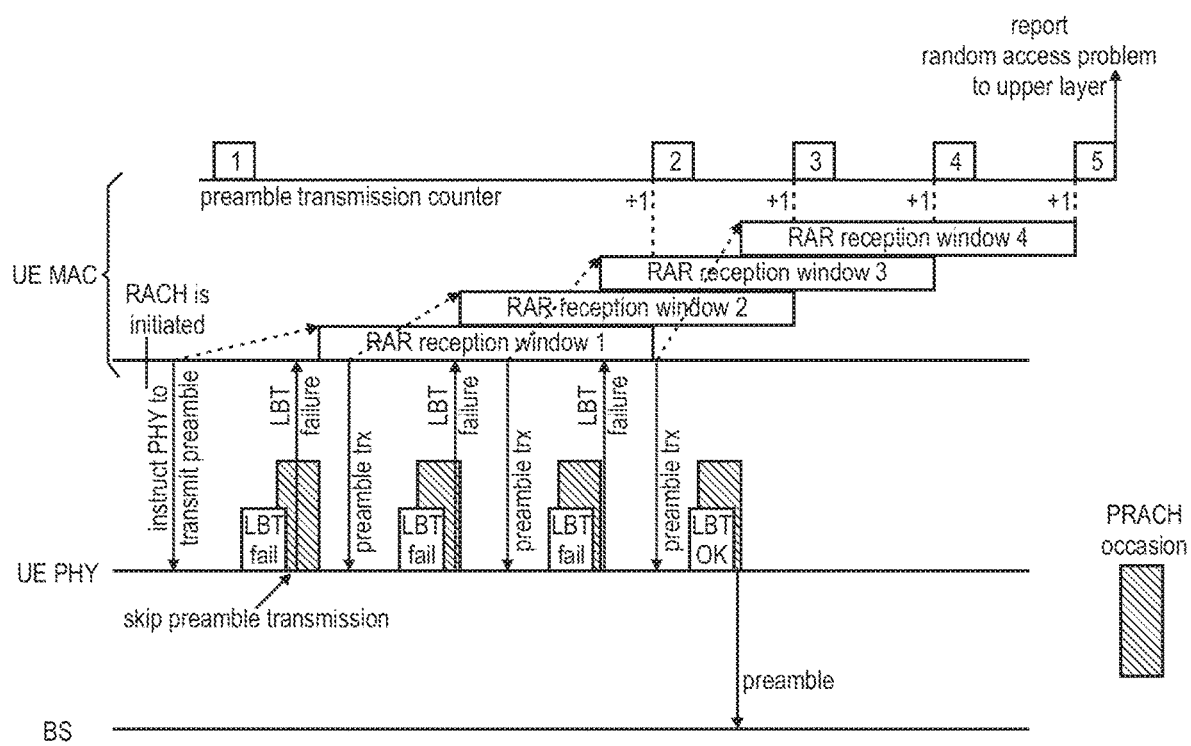
FIG. 13 illustrates the operation of the MAC and physical layer of the UE and the base station for the transmission of a random access preamble of a random access procedure according to an exemplary implementation of the second embodiment.

FIG. 12 is a sequence diagram for the UE behavior according to this improved random access procedure. FIG. 13 illustrates the exchange between the MAC layer and physical layer of the UE, and the gNB, similarly to the illustration in FIG. 7.

Figure 3:
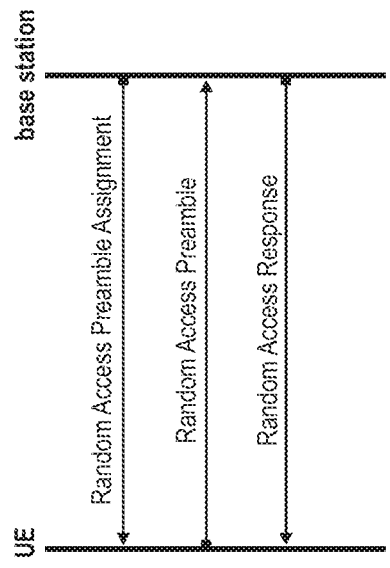
FIG. 3 illustrates the messages exchanged between an eNB and a UE when performing a contention-based RACH procedure.

The improved random access procedure is initiated by the MAC layer of the UE, which then instructs the physical layer of the UE to transmit a random access preamble as the first step of the random access procedure (see, e.g., FIG. 3). Furthermore, the MAC layer starts a corresponding random access response (RAR) reception window for the purpose of receiving the corresponding random access response.

The physical layer of the UE, responsible for the actual transmission of the preamble, first has to determine whether the unlicensed radio channel to be used for transmitting the preamble is actually clear. More specifically, in one example the physical layer performs a Clear Channel Assessment in order to comply with the LBT requirements for the unlicensed frequency spectrum, before being able to transmit the preamble in line with the instructions received from the MAC layer. Depending on the result of this determination, the preamble may be transmitted (if the channel is clear) or cannot be transmitted (if the channel is not clear).

If the radio channel is determined not to be clear for transmission of the preamble (i.e., LBT fail), the physical layer of the UE informs the MAC layer of the UE accordingly, e.g., by transmitting an LBT failure notification. The MAC layer thus obtains feedback from the physical layer as to whether or not the preamble could actually be transmitted or not. Upon receiving this LBT failure notification, the UE MAC decides to again perform a random access preamble transmission, and proceeds accordingly to instruct the physical layer to transmit the preamble as well as to start another RAR reception window. It should be noted here that the previously initiated RAR reception window is not stopped upon receiving the LBT failure notification, but is rather maintained. In other words, the MAC layer continues with the RAR reception window although the preamble for which this RAR reception window was started, actually was not transmitted and although a random access response message from the base station cannot be expected.

According to an optional implementation, upon receiving the LBT failure notification, the RAR reception window is not stopped, but the UE stops monitoring for the random access response. The RAR reception window is maintained running for the purpose of increasing the preamble transmission counter upon its expiry.

As a result, numerous RAR reception windows can be repeatedly created, one for each preamble transmission attempt (be it successful or unsuccessful). Each of these RAR reception windows may eventually expire (if not stopped before), the expiry resulting respectively in an increase of the preamble transmission counter. The preamble transmission counter is keeping track of the preamble transmissions (actually of the attempts to transmit a preamble), and can be compared to a threshold, for limiting the random access procedure and allowing the lower layers to inform the upper layers about a random access problem. Correspondingly, the MAC layer of the UE may determine whether the preamble transmission counter reaches a maximum and, if so, informs an upper layer of the UE about a random access failure. Optionally, UE may first will wait to finish the ongoing random access procedure before reporting to the higher layer about a RACH problem.

The upper layer of the UE can then decide on how to further proceed, for instance deciding to change to another cell, by performing a cell reselection procedure. For instance, the new radio cell can be selected to be on another frequency than the current problem, in order to avoid having the same LBT problems. Further, the reselection process may, e.g., prefer a radio cell on a licensed frequency rather than on an unlicensed frequency, so as to reduce the risk that also this other unlicensed frequency radio cell is congested (e.g., leads to a lot of LBT fails). The above-described UE behavior will be exemplarily explained based on FIG. 13. It is assumed that three attempts to transmit the preamble fail due to LBT, while the fourth attempt succeeds. In correspondence with these exemplary assumptions, FIG. 13 illustrates how the UE MAC layer operates the preamble transmission counter, the RAR reception windows, the preamble transmission instructions to the physical layer as well as the reception of the LBT failure notification from the physical layer. As apparent from FIG. 13, the RACH procedure is initiated, which leads to the preamble instruction transmission, the starting of the RAR reception window 1, and as well may, e.g., involve the starting of the preamble transmission counter set to the value 1. With each failed LBT and corresponding LBT failure notification, a new preamble transmission is triggered and a further RAR reception window is started by the MAC layer of the UE (see RAR reception windows 2, 3, 4 in FIG. 13). Correspondingly, multiple RAR reception windows are running in parallel, e.g., they may overlap as illustrated. For instance, RAR reception window 2 starts before RAR reception window 1 even expires. Whether and how much the RAR reception windows overlap may also depend, e.g., on the period between the PRACH occasions (PRACH periodicity) as well as, the starting point and length of the RAR reception windows.

As also illustrated in FIG. 13, the expiry of each of these reception windows leads to an increment of the preamble transmission counter by 1 (see "+1" in FIG. 13 respectively), such that the value of the preamble transmission counter increases from 1 to 5 at the end of the exemplary scenario in FIG. 13.

Exemplarily assuming that the maximum threshold for the preamble transmission counter is 5, the UE MAC layer, after determining that the maximum of the preamble transmission counter is reached (upon expiry of RAR reception window 4), proceeds to inform the upper layers about a random access problem.

The value of the maximum threshold of the preamble transmission counter can be exemplarily configured by the gNB. In one example, the gNB can transmit the corresponding configuration information as system information in its unlicensed radio cell. The system information can be received by all UEs in the radio cell and can be used to operate the preamble transmission counter according to the above-described improved random access procedure. One particular implementation can reuse the configuration already provided by the 5G NR in 3GPP TS 38.331, v15.3.0, section 6.3.2 RACH-ConfigGeneric information element incorporated herein by reference.

Although not mentioned so far, the RAR reception window can be exemplarily stopped when receiving a corresponding response for the transmitted preamble. The random access response or a random access procedure back-off indicator can be received from the serving base station, which both would be operated to stop a RAR reception window. The RACH back-off indicator can be transmitted by the serving base station for several reasons. For instance, in case where a cell is overloaded due to simultaneous RA procedures by many UEs, the gNB can send a backoff parameter through the RA response to cope with the overload situation. This backoff parameter is applicable only in cases where the UE performs the contention-based RA procedure. Once the UE receives the backoff parameter, if no RA response is received or the contention resolution is not successful, the UE will choose a random value between 0 and the value indicated by the backoff parameter. The UE then applies the selected value before the next attempt of the RA procedure; that is, the UE should wait at least for the time equivalent to the selected value before starting the next RA procedure. By delaying some UEs' attempts at the RA procedure with the backoff parameter, the gNB reduces the number of UEs simultaneously attempting the RA procedure. As the number of UEs attempting the RA procedure at a given time decreases, the success rate of the RA procedure goes up and eventually will solve the overload situation.

More specifically, there may be two options of which one or more reception window(s) are stopped by the reception of the random access response relating to the transmitted random access preamble. According to one option, the reception of the random access response only stops that RAR reception window which was started for the successfully transmitted random access preamble, i.e., for which the random access response is actually intended. Taking the example of FIG. 13 and assuming that a random access response is promptly received from the base station (e.g., RAR reception windows 2, 3, 4 are still running), the random access response would only result in stopping RAR reception window 4. The RAR reception windows 2 and 3 would eventually lapse and thus increase the preamble transmission counter. This behavior allows the preamble transmission counter to more accurately reflect the failed attempts for transmitting the random access preamble and thus to more early inform the upper layers of a random access problem.

On the other hand, this might lead to exceptional situations where although a RAR is received, other RAR reception windows that are not stopped and eventually lapse might trigger a report to upper layers that a random access problem exists. In one further exemplary implementation, this could be prevented by prohibiting the report of such a random access problem in case the random access response is actually received before.

According to another option, the reception of the random access response stops all the running RAR reception windows, also those windows that were started for failed random access preamble transmission attempts. Again taking the example of FIG. 13 and assuming that a random access response is promptly received from the base station (e.g., RAR reception windows 2, 3, 4 are still running), the random access response would result in stopping RAR reception windows 2, 3 and 4. This operation of the RAR reception windows upon reception of the random access response, would avoid the above mentioned problem of triggering the report of a random access problem after successfully receiving a random access response.

Figure 14:
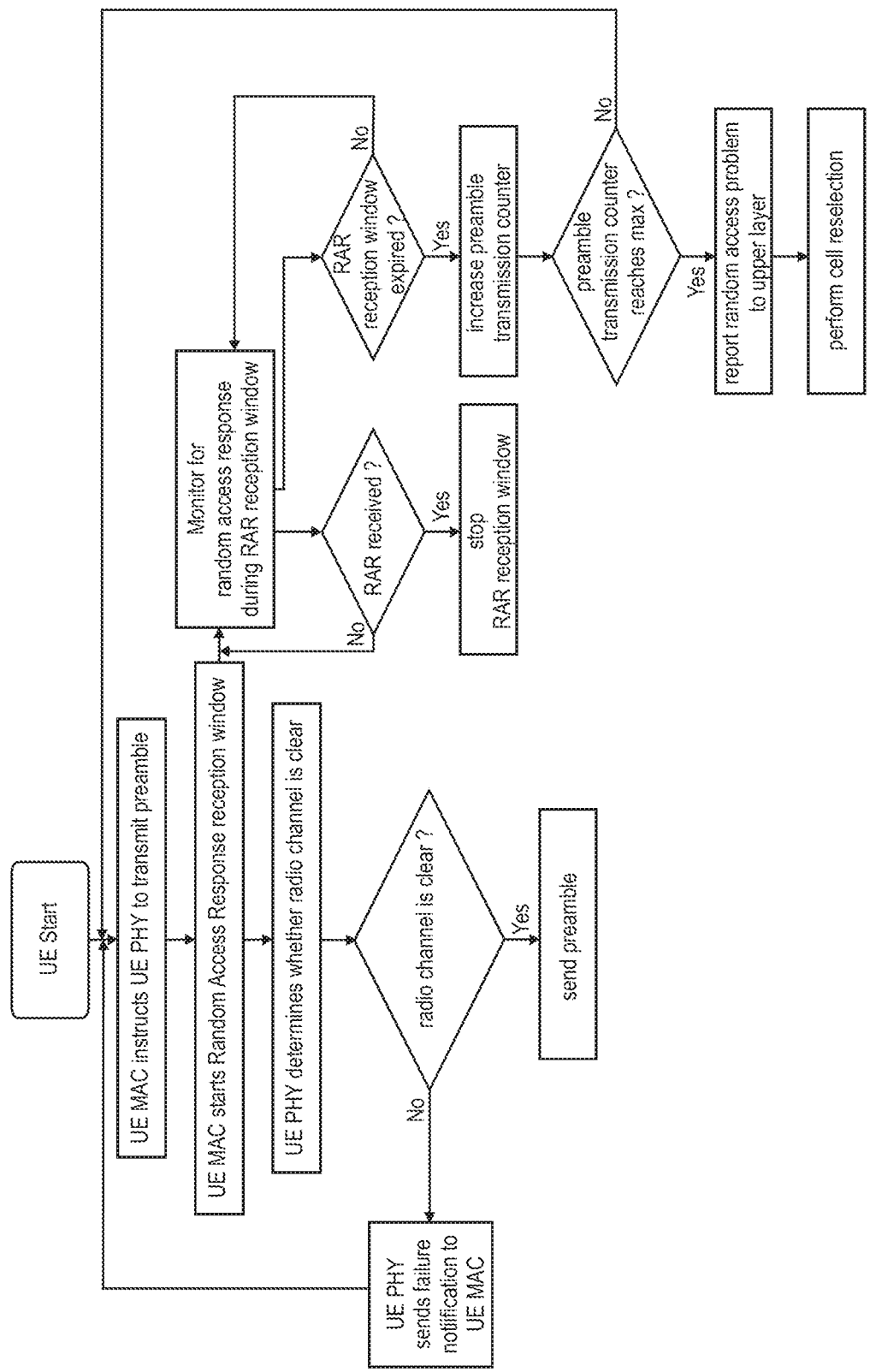
FIG. 14 is a flow diagram for the behavior of a UE, according to an exemplary implementation of the second embodiment.

A more detailed illustration of the UE behavior according to one exemplary implementation as described above is provided in FIG. 14. Further to what was illustrated and explained with reference to FIG. 12, FIG. 14 illustrates how the UE monitors the reception of the random access response during a RAR reception window. The RAR reception window can be stopped upon receiving a random access response from the serving base station. Further, in the UE behavior according to FIG. 14 it is also assumed that a cell reselection is performed in response to the determination that a random access problem has occurred (e.g., to another unlicensed or licensed frequency).

With regard to the further course of the random access procedure, the improved random access procedure may rely, e.g., on existing procedures. As explained, e.g., in connection with FIGS. 3 and 4, this might involve the transmission by the UE of the third message of the random access procedure upon successfully receiving the random access response (i.e., message 2). Further, this might involve as well the reception of the fourth message of the random access procedure, e.g., for resolving a contention experienced when transmitting the third message of the random access procedure. Moreover, in one such exemplary implementation, the expiry of the content resolution timer (e.g., when the fourth message is not received in time) may also lead to an increase of the preamble transmission counter, and thus possibly to a report of a RACH problem (if the maximum of the preamble transmission counter is reached).

When implementing the above described improved random access procedure in 5G NR communication systems as currently defined, RACH slots are configured for the UE, the RACH slots repeating itself every RACH configuration period. Each of these RACH slots comprises multiple RACH occasions (more details in said respect were described above). The shaded box in FIG. 13 can thus be exemplarily understood as a RACH slot, and the actual RACH occasion to be used for the transmission can slightly vary within this RACH slot. This is also illustrated exemplarily in FIG. 13, which it is assumed that the RACH occasion for the first preamble transmission attempt is rather at the beginning of this first RACH slot, compared to the subsequent RACH slots. Correspondingly, the first LBT check (in FIG. 13 assumed to be LBT fail) is as a result well before the beginning of this RACH slot, compared to the remaining RACH slots.

Furthermore, depending on the particular implementation on when the RAR reception windows are actually started, the LBT failure notification may be received by the UE MAC layer even before the corresponding random access response reception window is started.

As apparent from FIG. 13, in one exemplary implementation the RAR reception window is not started immediately upon instructing the PHY layer to transmit the preamble, but can be started at a later point in time, e.g., upon or after the first PRACH occasion the PHY layer can actually use to transmit the preamble. Reception of the random access response is expected after the next PRACH occasion, which from the MAC layer perspective, is the one expected to be used by the PHY layer to transmit the preamble.

The above described improved random access procedure can be easily implemented into the current specifications for 5G NR, as it reuses the existing RAR reception window concept to quickly allow reporting on an random access problem to the upper layers in case of LBT failures. The existing 5G NR random access procedure as defined in 3GPP 38.321 v15.3.0, section 5.1 can be extended according to one exemplary implementation as follows:

"If the Random Access procedure is initiated for NR-Unlicensed and UE MAC receives LBT Failure Notification from UE PHY:
  UEMAC continue to run RAR reception window. When RAR reception window expires, UE increases PREAMBLE TRANSMISSION COUNTER else
  UEMAC runs RAR reception window to monitor RAR message.
If the Random Access procedure is initiatedfor NR-Unlicensed, UEMAC instructs UE PHY to send preamble transmission even if RAR reception window is running"

Further exemplary implementations of the second embodiment are presented in the following. Corresponding exemplary implementations based on the following principles will be explained based on the illustration in FIG. 15-21.

One the underlying principles employed in the following second embodiments is that failed preamble transmission attempts due to failed LBT will effectively not result in an increase of the preamble transmission counter; this is achieved, e.g., by operating the RAR reception window in an appropriate manner such that it does not expire and thus does not increase the preamble transmission counter. The operation of the RAR reception window can be assisted by a suitable feedback from the lower layer as to whether the preamble was transmitted or not due to an LBT failure.

Moreover, in order to still be able to quickly inform upper layers about a random access problem that is the result of these LBT failures, a radio access timer can be, e.g., implemented to control whether a random access procedure is successfully completed or not. If the random access procedure is not completed, the upper layer can be informed accordingly about a random access problem.

Figure 15:
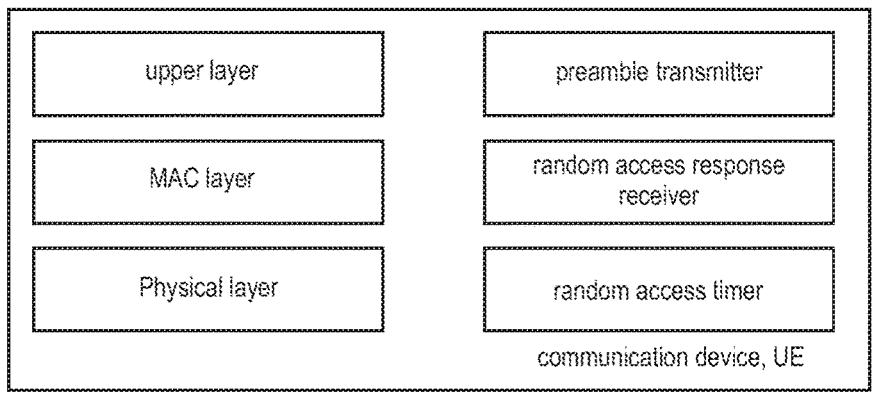
FIG. 15 illustrates a structure of the UE according to an exemplary implementation of a second embodiment.

FIG. 15 illustrates a simplified and exemplary UE structure according to the present solution and can be implemented based on the general UE structure explained in connection with FIG. 8 above. The various structural elements of the UE illustrated in said figure can be interconnected between one another, e.g., with corresponding input/output nodes (not shown), e.g., in order to exchange control and user data and other signals. Although not shown for illustration purposes, the UE may include further structural elements.

As apparent therefrom, the UE may include an upper layer (could be more than one), a MAC layer (or MAC layer entity), a Physical layer (or Physical layer entity), a preamble transmitter, a random access response receiver, as well as a random access timer in order to participate in the improved procedures for performing a random access as will be explained in the following.

In the present case as will become apparent from the below disclosure of the different embodiments and variants thereof, the processor can thus be exemplarily configured to at least partly perform one or more of the following steps of initiating a random access procedure, operating the MAC layer as well as the physical layer, of operating a random access response reception window, of determining whether or not an unlicensed radio channel is clear, of exchanging instructions and notifications between the MAC layer and the physical layer, of operating a preamble transmission counter, of operating a random access timer and of informing upper layers of the UE about a random access failure.

The transmitter can in turn be configured to be able to at least partly transmit messages of the random access procedure, such as the random access preamble. The receiver can in turn be configured to be able to at least partly perform one or more of the following steps of receiving reference signals, of receiving configuration information via system information or configuration messages (such as of the RRC protocol), and of receiving a random access response message from the serving base station.

Figure 16:
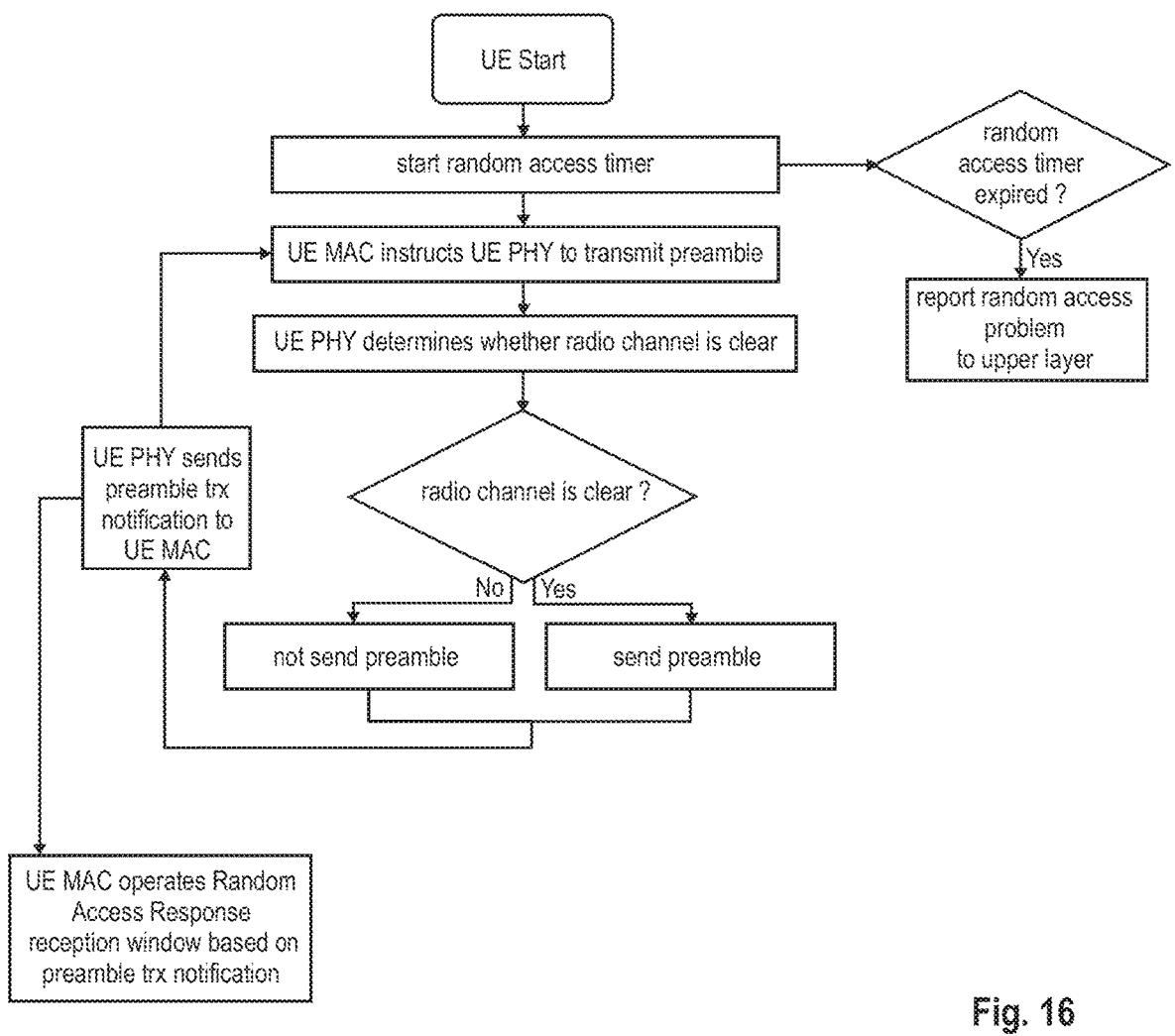
FIG. 16 is a flow diagram for the behavior of a UE, according to an exemplary implementation of the second embodiment.
Figure 17:
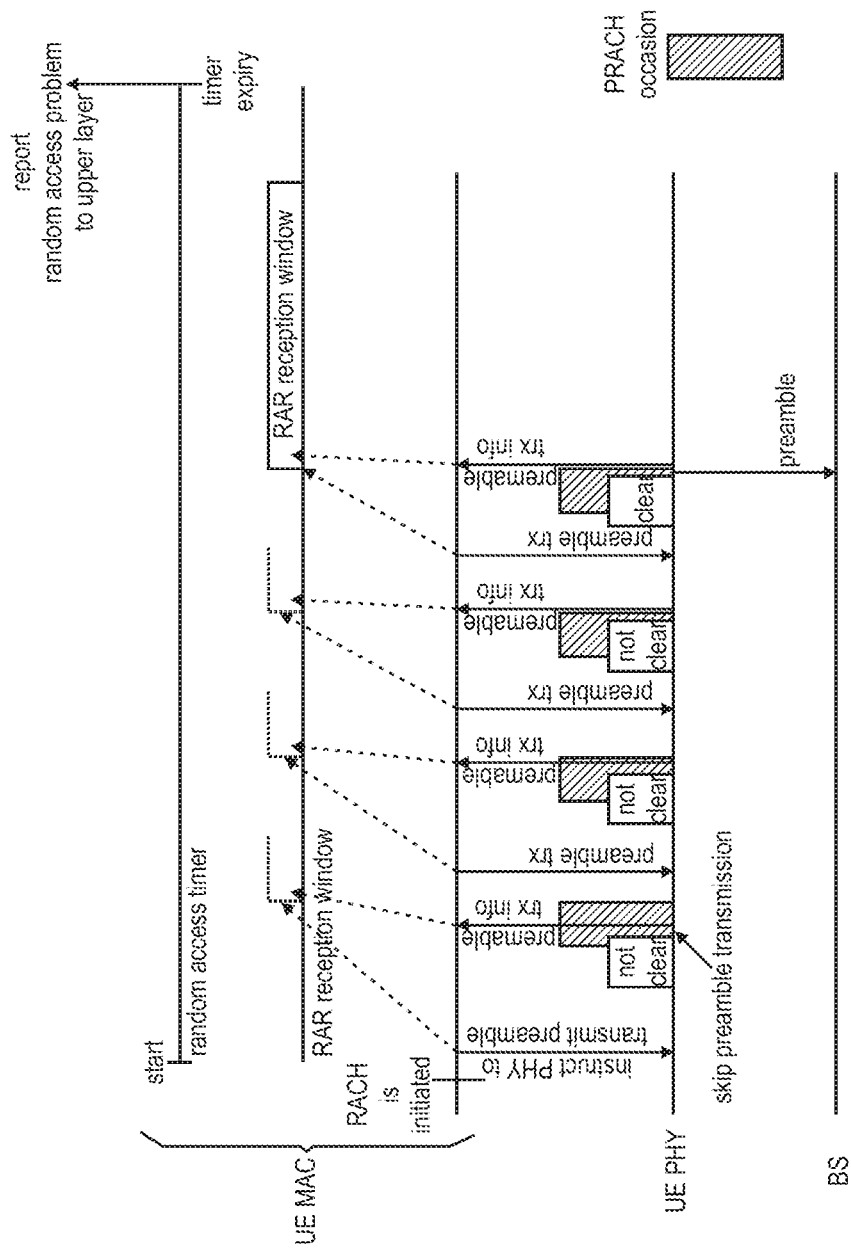
FIG. 17 illustrates the operation of the MAC and physical layer of the UE and the base station for the transmission of a random access preamble of a random access procedure according to an exemplary implementation of the second embodiment.

FIG. 16 is a sequence diagram for the UE behavior according to this improved random access procedure. FIG. 17 illustrates the exchange between the MAC layer and physical layer of the UE, and the gNB, similarly to the illustration in FIG. 7.

The improved random access procedure is initiated by the MAC layer of the UE, which then can start the random access timer for this random access procedure. The random access timer is started to be able to monitor and react to the length of the random access procedure. The value of the random access timer is dimensioned accordingly.

The MAC layer further instructs the physical layer of the UE to transmit a random access preamble as the first step of the random access procedure (see, e.g., FIG. 3).

The physical layer of the UE, responsible for the actual transmission of the preamble, first has to determine whether the unlicensed radio channel to be used for transmitting the preamble is actually clear for the transmission or not, before being able to transmit the preamble in line with the instructions received from the MAC layer. Depending on the particular implementation (as will be explained in more detail below in connection with FIG. 18, 19 and FIG. 20, 21), this may either involve that the UE performs a Clear Channel Assessment, or determines whether the gNB acquired the unlicensed radio channel for the UE to perform the preamble transmission. Depending on the result of this determination, the preamble may be transmitted (if the channel is clear) or cannot be transmitted (if the channel is not clear).

A suitable feedback notification about success or not success can be transmitted by the physical layer of the UE to the MAC layer of the UE. The actual implementation of this step may differ, e.g., it may include that a positive feedback notification (if preamble could be transmitted) as well as a negative feedback notification (if preamble could not be transmitted) is provided to the MAC layer. However, it may already suffice if just one of the two notifications, be it the negative (see, e.g., FIG. 18, 19) or positive one (see, e.g., FIG. 20, 21) are provided to the MAC layer.

In any case, the MAC layer thus obtains feedback from the physical layer as to whether or not the preamble could actually be transmitted or not. Upon receiving this notification ("preamble trx notification" in FIG. 17), the UE MAC decides to again perform a random access preamble transmission, and proceeds accordingly to instruct the physical layer to transmit the preamble.

As mentioned before, the MAC layer is also responsible for operating the RAR reception window, which is typically used to control the period of time during which the UE is to monitor for the reception of the random access response. The improved random access procedure takes the preamble trx feedback from the physical layer into account for the operation of the RAR reception window. For instance, the window operation can be thus that those preamble transmission attempts that fail due to a LBT fail do not result in an increase of the preamble transmission counter. This can be implemented in a various ways, e.g., by starting the timer only when the preamble transmission was actually successful (e.g., positive feedback, FIG. 20, 21) or by stopping the window or aborting its start when the preamble transmission was actually not successful (e.g., negative feedback, see FIG. 18, 19).

FIG. 17 illustrates how the layers and mechanisms within the UE operate for the transmission of the random access preamble according to an exemplary implementation of this improved random access procedure (see also FIG. 16). In particular, FIG. 17 illustrates the operation of the RAR reception window and the random access timer, the exchange of notifications between the MAC and physical layer of the UE. As apparent therefrom, the RACH procedure is initiated, which results in both the start of the random access timer and the preamble instruction transmission from the MAC layer to the physical layer (see FIG. 17 arrow labeled "preamble trx"). The result of the determination whether the radio channel over which the preamble is to be transmitted is clear or not, is illustrated with the boxes "not clear" and "clear." The corresponding feedback from the physical layer to the MAC layer about the (un)successful transmission of the preamble is also illustrated in FIG. 17 based on the arrow labeled "preamble trx info."

The operation of the RAR reception window may depend on both the transmit-preamble instructions of the MAC to PHY layer and the transmission feedback (e.g., preamble transmission failed due to failed LBT) from the physical layer. As illustrated in FIG. 17, only the RAR reception window after the successful preamble transmission is kept running by the UE. RAR reception windows for the previous unsuccessful preamble transmission attempts are not kept running, e.g., either are not started or simply stopped so as to avoid that these result in an increased preamble transmission counter and thus accelerate the reporting of a random access problem.

The reporting of a random access problem could still be controlled by the maximum threshold of the preamble transmission counter (e.g., as typically done above). Optionally, the UE may first want to wait to finish any ongoing random access procedure before reporting to the higher layer about a RACH problem.

Another mechanism to report random access problems to the upper layer is the random access timer illustrated at the top of FIG. 17. The random access timer runs in parallel to the remaining mechanisms, and, upon its expiry, will trigger the report to the upper layers that there is a random access problem.

The value of the maximum threshold of the preamble transmission counter can be exemplarily configured by the gNB, e.g., in the same manner as already explained above. In brief, the gNB can use system information to transmit suitable configuration information to the UEs.

Further, the value of the random access timer can be, e.g., fixed beforehand (e.g., by specification or as parameter by the network operator). In addition or alternatively, the value for the random access timer operation can be also configured by the gNB, e.g., using system information or RRC configuration messages. One particular implementation can reuse the configuration already provided by the 5G NR in 3GPP TS 38.331, v15.3.0, section 6.3.2 RACH-ConfigGeneric information element incorporated herein by reference.

As mentioned above for the normal and improved random access procedures, the RAR reception window can be exemplarily stopped when receiving a corresponding response for the transmitted preamble. The random access response or a random access procedure back-off indicator can be received from the serving base station, which both would lead to stopping of the RAR reception window.

In the following two different exemplary variants of the just described improved random access procedure (see FIG. 15, 16, 17) will be explained.

Figure 18:
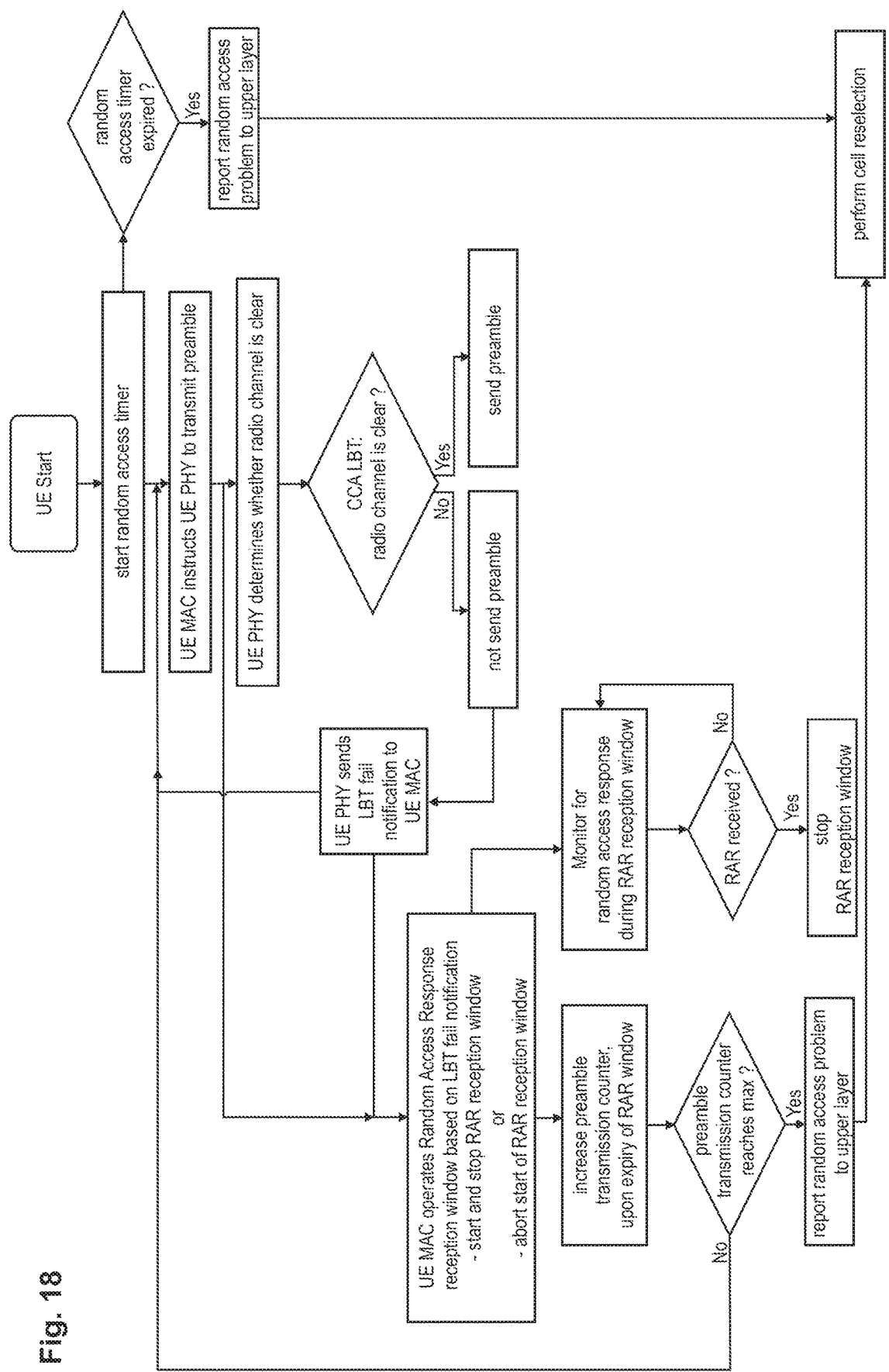
FIG. 18 is a flow diagram for the behavior of a UE, according to an exemplary implementation of the second embodiment.
Figure 19:
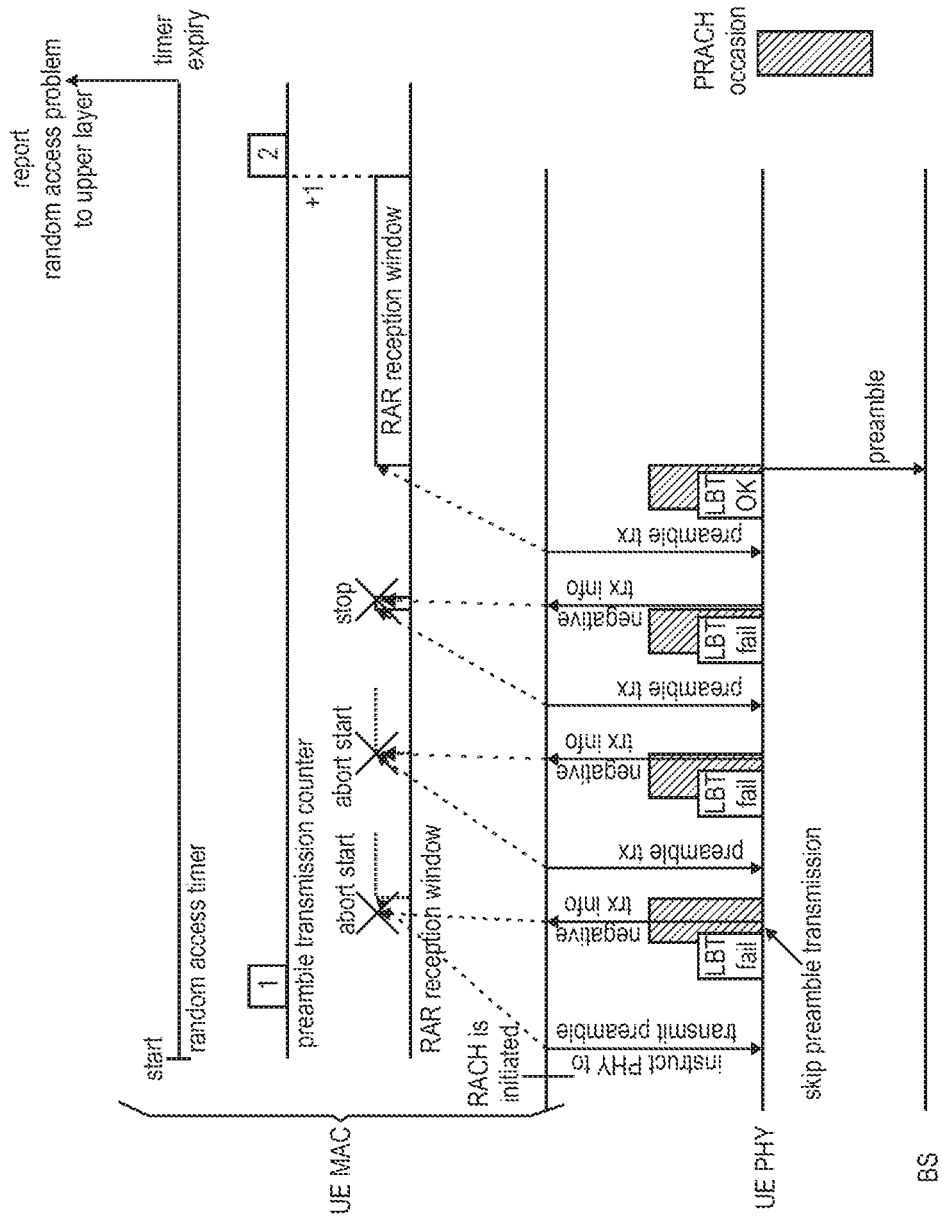
FIG. 19 illustrates the operation of the MAC and physical layer of the UE and the base station for the transmission of a random access preamble of a random access procedure according to an exemplary implementation of the second embodiment.

A first variant will be explained with reference to FIGS. 18 and 19, wherein FIG. 18 illustrates the UE behavior, which is based on the UE behavior of FIG. 16 but is more specific. FIG. 19 illustrates an exemplary exchange between the UE layers and the gNB for transmitting a random access preamble. As apparent from FIG. 18, the UE behavior is exemplarily based on that the UE performs the Clear Channel Assessment of the obligatory LBT on the unlicensed radio channel itself (alternatively, the LBT could be performed by the gNB for the UE as will explained for the second variant, see FIG. 20, 21). Further, the exemplary implementation of FIGS. 18 and 19 also assumes that a negative feedback is provided from the physical layer when the LBT failed and the preamble could not be transmitted (in addition or alternatively, a positive feedback could be used as will explained for the second variant, see FIG. 20, 21).

The negative feedback can be used to operate the RAR reception window. For example, it is assumed that when the MAC layer instructs the UE PHY layer to transmit the preamble, the UE MAC layer will also trigger the start of the RAR reception window (e.g., to begin after the next PRACH occasion to be used by the UE PHY to transmit the preamble). Depending on the particular implementation, the timing of the feedback from the PHY layer and the actual beginning of the RAR reception window, the RAR reception window is either stopped upon receiving the negative feedback (when the RAR reception window was already running) or the start of the RAR reception window is aborted (when the RAR reception window was triggered but was not yet running).

Furthermore, the negative feedback can be used as trigger for the MAC layer to initiate another preamble transmission, e.g., to retransmit the random access preamble, in view of that the previous attempt failed. This avoids the need to wait longer, e.g., until the expiry of the RAR reception window.

As explained before, the preamble transmission counter can be operated based on the expiry of the RAR reception window, such that the counter is increased every time a RAR reception window expires. Furthermore, when the preamble transmission counter reaches a maximum (threshold), the UE MAC layer may proceed to report a random access problem to the upper layers, which in turn can try solving the problem by reselecting another radio cell to camp on (e.g., the new radio cell can have a different frequency than the current congested unlicensed radio cell, the new radio cell being a licensed or unlicensed radio cell).

An exemplary sequence of events in line with the above-described variant is illustrated in FIG. 19, wherein it is again exemplarily assumed that the first three preamble transmission attempts fail due to an LBT failure. Again, it is exemplarily assumed that the MAC layer triggers the RAR reception window to begin right after the next PRACH occasion the PHY layer can use to transmit the instructed random access preamble. Depending on how the CCA of LBT is implemented in the UE PHY, the negative feedback can be received before or after the RAR reception window actually begins. In the exemplary illustration of FIG. 19 at the first and second PRACH occasion, the negative feedback is received such that the start of the RAR reception window is aborted. Thus, the RAR reception window is not started at all (illustrated with a dashed open box, where the RAR reception window would have started otherwise). On the other hand, the third negative feedback is received when the corresponding RAR reception window is already running, and thus triggers the MAC layer to stop the RAR reception window (illustrated with a solid box).

A further RAR reception window is started for the fourth PRACH occasion (i.e., the fourth preamble transmission attempt), which now is successfully used for transmitting the preamble. Correspondingly, no negative feedback is received by the MAC layer, which thus maintains the RAR reception window running and monitors for the reception of a random access response. Assuming that no random access response is received (in time), the RAR reception window expires and increases the preamble transmission counter (see "+1" in FIG. 19).

FIG. 19 also illustrates the parallel operation of the random access timer which can separately result in that the UE MAC layer reports about the random access problem (even if the preamble transmission counter has not reached its maximum).

According to specific implementations, the random access timer can be adapted differently to the reception of a backoff indicator as the response to the random access preamble. As mentioned above, the backoff indicator transmitted by the gNB can stop the RAR reception window. One option is that the random access timer is paused upon receiving the backoff indicator until a further retransmission of the preamble is performed by the UE. Another option would be to maintain the random access timer running, upon receiving the backoff timer in the random access response. Further, in this second option, the value of the random access timer can be configured by the gNB to be higher so as to compensate for the backoff indication.

Figure 20:
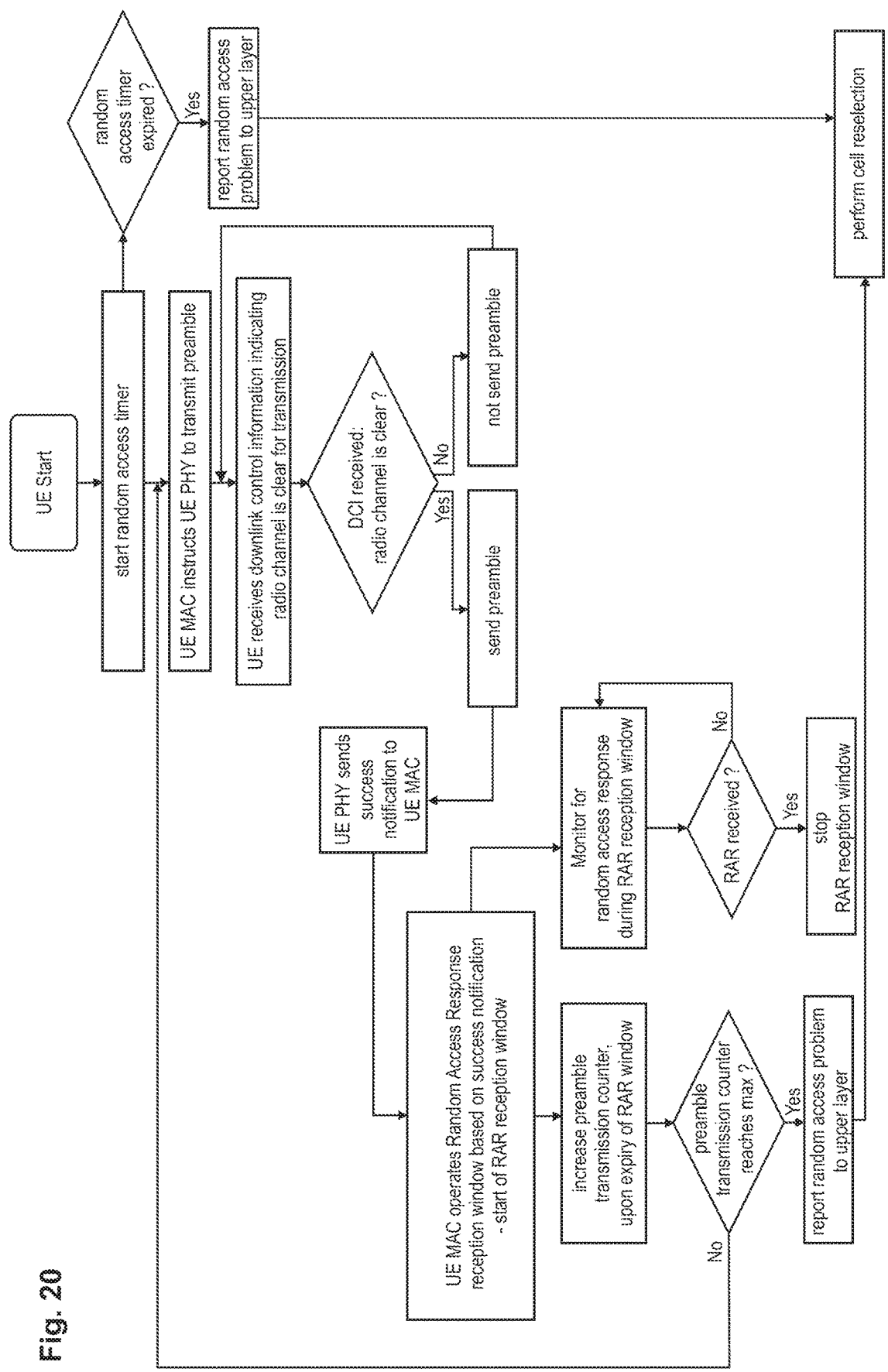
FIG. 20 is a flow diagram for the behavior of a UE, according to an exemplary implementation of the second embodiment.
Figure 21:
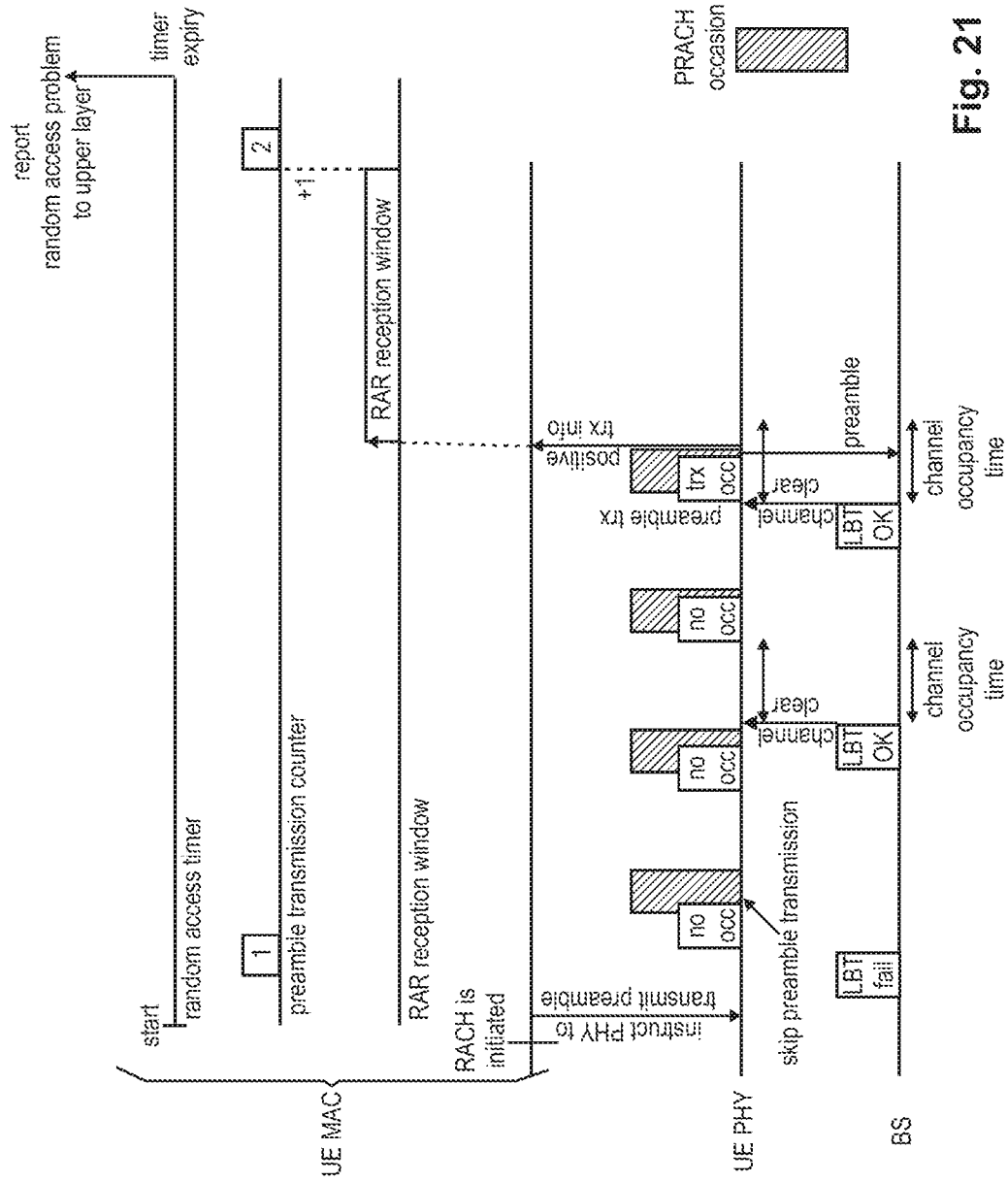
FIG. 21 illustrates the operation of the MAC and physical layer of the UE and the base station for the transmission of a random access preamble of a random access procedure according to an exemplary implementation of the second embodiment.

The second variant will be explained with reference to FIGS. 20 and 21, wherein FIG. 20 illustrates the UE behavior, which is based on the UE behavior of FIG. 16 but is more specific. FIG. 21 illustrates an exemplary exchange between the UE layers and the gNB for transmitting a random access preamble. As apparent from FIG. 20, the UE behavior exemplary assumes that the UE does not perform itself the Clear Channel Assessment, but rather that the gNB checks whether the channel is clear for transmission in place of the UE. In more detail, the gNB could perform the CCA on a regular basis and could inform one or more UEs in its cell on the result. For instance, the gNB might transmit downlink control information to all UEs in its unlicensed radio cell, e.g., using a common DCI in a common search space. The downlink control information can include suitable information for the UE to derive that the radio channel is clear for transmission, e.g., of the preamble.

In one exemplary implementation the UE transmits the random access preamble within a brief period of time after receiving the DCI from the gNB indicating that the radio channel is available for the UE. For instance, when the switching gap between the downlink (of the DCI) and the uplink (transmission of PRACH resource) is less than a brief period of time (e.g., 16 microseconds), the UE does not need to perform listen-before-talk to acquire the unlicensed spectrum first. In other words, the reception of the DCI provides the UE with a time trigger (or time period) to perform (within a specific period of time) the transmission of the random access preamble so as to avoid performing a CCA on its own.

Based on whether or not a corresponding DCI is received at the UE indicating that the radio channel is free or not, the UE proceeds to transmit the preamble (if channel is clear for transmission) or does not transmit the preamble (if channel is not clear for transmission). For example, the UE checks whether corresponding PRACH radio resources are available at that time during which the radio channel is considered to be free. This can be understood as the channel occupancy time (COT) during which the base station has acquired the radio channel.

When no preamble could be transmitted, the exemplary UE behavior could provide that the UE waits for the next PRACH occasion to transmit the preamble. This might again involve that the UE receives a DCI from its serving base station as to whether the radio channel is clear for transmission. In such a case, it is not necessary for the UE MAC layer to transmit further instructions to the PHY layer about (re)transmitting the random access preamble, after a failed preamble transmission attempt.

Moreover, in the exemplary variant of FIGS. 20 and 21, the feedback from the UE PHY to the UE MAC layer is implemented as a positive feedback, i.e., indicating that the preamble could successfully be transmitted (DCI check as to whether channel is clear was positive too). No feedback is transmitted to the UE MAC layer if the preamble could not be transmitted. The UE MAC layer however may determine, from the absence of the positive feedback, that no preamble was transmitted.

As discussed with the first variant, the feedback can be used by the UE MAC layer to operate the RAR reception window. It can be exemplarily implemented by starting the RAR reception window upon receiving the positive feedback information from the UE physical layer. Thus, rather than (only) operating the RAR reception window based on the transmission of the preamble transmission instruction, the UE MAC layer can await the positive feedback from the lower layer to start the RAR reception window. This simplifies the operation of the RAR reception window since there is no need to abort or stop RAR reception windows that were triggered for failed preamble transmission attempts.

As explained before, the preamble transmission counter can be operated based on the expiry of the RAR reception window, such that the counter is increased every time a RAR reception window expires. Furthermore, when the preamble transmission counter reaches a maximum (threshold), the UE MAC layer may proceed to report a random access problem to the upper layers, which in turn can try solving the problem by reselecting another radio cell to camp on (e.g., the new radio cell can have a different frequency than the current congested unlicensed radio cell, the new radio cell being a licensed or unlicensed radio cell).

An exemplary sequence of events in line with the above-described variant is illustrated in FIG. 21, wherein it is exemplarily assumed that the first three preamble transmission attempts fail due to an LBT failure. As apparent therefrom, the BS (e.g., gNB) performs the Clear Channel Assessment, and if successful, transmits a corresponding indication, such as a DCI ("channel clear" in FIG. 21). Based on the DCI, the UE determines that the radio channel is clear, e.g., for the transmission of the random access preamble. For example, the UE can determine whether there are suitable PRACH resources during the time the radio channel has been acquired by the base station. In the example of FIG. 21, the base station acquires the radio channel right after the second PRACH occasion, and transmits a corresponding indication to the UE ("channel clear"). However, during the channel occupancy time acquired by the base station, the UE does not have any PRACH occasion and thus again is not able to transmit the instructed random access preamble. On the other hand, for the fourth PRACH occasion, the radio channel is acquired by the base station, and a corresponding indication is received by the UE, which then transmits the preamble to the serving base station.

Correspondingly, after the UE PHY receives the corresponding instruction from the MAC layer to transmit a preamble, the UE PHY checks that no corresponding DCI is received from the BS (because the LBT failed) and determines that no preamble can be transmitted. According to this implementation, no negative feedback is transmitted to the MAC layer, but rather the UE PHY awaits the next PRACH occasion to try transmitting the random access preamble. Consequently, when compared, e.g., to the first variant (see FIG. 19), less interaction is needed between the UE MAC and physical layer, especially in cases where the radio channel is too congested for the preamble to be transmitted.

The gNB continues to perform LBT, and at the fourth PRACH occasion, the LBT is successful ("LBT OK" in FIG. 11). A corresponding indication is received by the UE from the gNB. The UE thus learns therefrom that the unlicensed radio channel is clear, without having to perform a CCA/LBT on its own. The UE can then proceed to transmit the random access preamble. The UE MAC layer is informed about the successful preamble transmission, which results in that the RAR reception window is started to monitor for the reception of the random access response from the base station.

The operation of the RAR reception window and the preamble transmission counter are also illustrated in FIG. 21. As apparent, upon expiry of the RAR reception window, the preamble transmission counter is increased. Eventually, when the preamble transmission counter reaches its maximum, a report to upper layers can be triggered about a random access problem.

The random access timer is kept running in parallel, which can then separately result in that the UE MAC layer reports about the random access problem (even if the preamble transmission counter has not reached its maximum).

As already mentioned for the first variant, the random access timer can be adapted differently to the reception of a backoff indicator as the response to the random access preamble. One option is that the random access timer is paused upon receiving the backoff indicator until a further retransmission of the preamble is performed by the UE. Another option would be to maintain the random access timer running, upon receiving the backoff timer in the random access response. Further, in this second option, the value of the random access timer can be configured by the gNB to be higher to compensate for the backoff indication.

In the present variant, the UE MAC entity does not even need to know about the PRACH occasion which is used by UE PHY to transmit the random access preamble, since the start of the RAR reception window is effected upon reception of the positive feedback that the preamble was indeed transmitted. In that case, the positive feedback may also include information about the used PRACH resources, such that the UE may calculate the correct value of RA-RNTI (Random Access RNTI) for being able to monitor the random access response (msg2).

In the above explanation, it was assumed that the radio resources for transmitting the random access preamble (e.g., PRACH occasions) were already configured beforehand, such that the UE physical layer can proceed to transmit the preamble using those preconfigured radio resources. In addition, or alternatively, the radio resources for transmitting the preamble could also be configured more dynamically. For example, the DCI, transmitted by the gNB to indicate that the radio channel is clear for transmission of the preamble, may also include indications as to the radio resources that the UE can use to transmit the random access preamble. For instance, the radio resources indicated by the DCI can be configured in such a way that the switching gap between DL and UL is less than 16 µsec, such that the UE does not need to perform LBT on its own.

With regard to the further course of the random access procedure, the improved random access procedure may rely, e.g., on existing procedures. As explained, e.g., in connection with FIGS. 3 and 4, this might involve the transmission by the UE of the third message of the random access procedure upon successfully receiving the random access response (i.e., message 2). Further, this might involve as well the reception of the fourth message of the random access procedure, e.g., for resolving a contention experienced when transmitting the third message of the random access procedure. Moreover, in one such exemplary implementation, the expiry of the content resolution timer (e.g., when the fourth message is not received in time) may also lead to an increase of the preamble transmission counter, and thus possibly to a report of a RACH problem (if the maximum of the preamble transmission counter is reached).

According to still a further implementation, the Physical layer of the UE provides the COT information to the MAC layer. Based on this information from the physical layer, the MAC layer instructs the physical layer to send the random access preamble. Consequently, in this option there is no need for the physical layer to provide the positive or negative feedback to the MAC layer. The UE MAC layer only instructs the Physical layer to transmit the preamble, upon determining that the gNB has occupied the channel. The remaining behavior can then be, e.g., as the prior art.

As also discussed with reference to improved random access procedure of the second embodiment explained in connection with FIG. 11-14, the improved random access procedures explained in connection with FIG. 15-21 can be implemented in 5G NR communication systems. RACH slots with multiple RACH occasions are defined and can be selected by the UE to transmit the random access preamble. The above described improved random access procedure can be easily implemented into the current specifications for 5G NR, as it reuses the existing RAR reception window concept to quickly allow reporting on an random access problem to the upper layers in case of LBT failures. The existing 5G NR random access procedure as defined in 3GPP 38.321 v15.3.0, section 5.1 can be extended according to one exemplary implementation as follows:

"When the Random Access procedure is initiated on a NR unlicensed Serving Cell, the MAC entity shall:
Starts RACH Timer
If RACH timer expires
Indicates a Random Access problem to upper layers"

According to further embodiments for an improved random access procedure, a further condition can be defined for reporting a random access problem to the upper layers. As described for the first embodiment in detail, a congested radio cell can be identified by the UE based on the number of continuously missing reference signals in the radio cell.

In such a congested radio cell, the UE or the gNB will not or only seldom be able to acquire the radio channel to allow for the transmission of a random access preamble. Consequently, the additional trigger for performing cell reselection, according to one of the many variants discussed for the first embodiment, can be used in the present case as trigger for the UE to report a random access problem to the upper layers. This trigger for reporting the random access problem can thus be applied by the UE, for instance in cases where the eNB has problems acquiring the channel and thus fails to transmit the reference signals.

Further Aspects

According to a first aspect, a user equipment is provided, which comprises a receiver, which receives reference signals from a serving base station on which the UE is camping, the serving base station controlling an unlicensed serving radio cell in which the UE is located. Processing circuitry of the UE monitors the reception of reference signals to determine a number of reference signals that are continuously missing. The processing circuitry determines to perform cell reselection from the unlicensed serving radio cell on which the UE is camping to another radio cell that has a different frequency than the unlicensed serving radio cell, in case the determined number of reference signals that are continuously missing is above a threshold.

According to a second aspect provided in addition to the first aspect, the receiver receives a value for the threshold in system information transmitted by the serving base station. In addition or alternatively, the receiver receives a value for the threshold in a configuration message transmitted by the serving base station. In one optional implementation, the configuration message being of a Radio Resource Control, RRC, protocol.

According to a third aspect provided in addition to the first or second aspect, the reference signals are channel state information reference signals, CSI-RS, and/or synchronization signal block, SSB, reference signals, according to a 3GPP 5th generation new radio communication system. In one option, the missing reference signals are not transmitted by the serving base station because the serving base station did not successfully perform a clear channel assessment on the unlicensed serving radio cell. In one option, the UE is in an idle mode, and a receiver of the UE, when in operation, receives a configuration information whether to use the CSI-RS and/or the SSB-RS to determine the number of continuously missing reference signals.

According to a fourth aspect provided in addition to any of first to third aspects, the processing circuitry selects the other radio cell based on radio cell measurements performed by the UE for the other radio cell. In one optional implementation, the different frequency of other radio cell is an unlicensed or a licensed frequency.

According to a fifth aspect, a method is provided comprising the following steps performed by a user equipment. The UE receives reference signals from a serving base station on which the UE is camping. The serving base station controls an unlicensed serving radio cell in which the UE is located. The UE monitors the reception of reference signals to determine a number of reference signals that are continuously missing. The UE determines to perform cell reselection from the unlicensed serving radio cell on which the UE is camping to another radio cell that has a different frequency than the unlicensed serving radio cell, in case the determined number of reference signals that are continuously missing is above a threshold.

According to a sixth aspect, a user equipment is provided, which comprises processing circuitry, which, upon a random access procedure is initiated, operates a medium access control, MAC, layer of the UE to instruct a physical layer of the UE to transmit a random access preamble for the initiated random access procedure and operates the MAC layer to start a random access response, RAR, reception window for receiving a random access response. The processing circuitry operates the physical layer to determine whether an unlicensed radio channel is clear for transmitting the random access preamble. Upon determining that the unlicensed radio channel is not clear, the processing circuitry operates the physical layer and a transmitter of the UE to transmit a failure notification to the MAC layer about the unlicensed radio channel not being clear for transmission of the random access preamble. Upon receiving the failure notification, the processing circuitry operates the MAC layer to instruct the physical layer to retransmit the random access preamble for the initiated random access procedure and operates the MAC layer to start a further RAR reception window for receiving a further random access response from the serving base station. The processing circuitry operates a preamble transmission counter to be increased in case any RAR reception window expires. The processing circuitry operates the MAC layer to inform an upper layer of the UE about a random access failure upon determining that the preamble transmission counter is above a maximum preamble transmission threshold.

According to a seventh aspect provided in addition to the sixth aspect, upon determining that the unlicensed radio channel is clear, the processing circuitry operates the physical layer and a transmitter of the UE to transmit the random access preamble. In one optional implementation, the processing circuitry monitors, during the time period of a RAR reception window, the reception of the random access response. The processing circuitry does not monitor, during the time period of a RAR reception window, the reception of the random access response in case the failure notification is received for that RAR reception window.

According to an eighth aspect provided in addition to the sixth or seventh aspect, upon receiving a random access response or a random access procedure backoff indicator, the processing circuitry operates the MAC layer to stop the RAR reception window that was started for that random access preamble corresponding to the received random access response. Alternatively, upon receiving a random access response or a random access procedure backoff indicator, the processing circuitry operates the MAC layer to stop all the running RAR reception windows. According to a ninth aspect provided in addition to any of the sixth to eighth aspects, a receiver of the UE receives configuration information via system information, indicating a value for the maximum preamble transmission threshold, optionally wherein the system information is received from the serving base station.

According to a tenth aspect, a method is provided comprising the following steps performed by a user equipment. Upon a random access procedure is initiated, the UE operates a medium access control, MAC, layer of the UE to instruct a physical layer of the UE to transmit a random access preamble for the initiated random access procedure and operates the MAC layer to start a random access response, RAR, reception window for receiving a random access response. The UE operates the physical layer to determine whether an unlicensed radio channel is clear for transmitting the random access preamble. Upon determining that the unlicensed radio channel is not clear, the UE operates the physical layer and a transmitter of the UE to transmit a failure notification to the MAC layer about the unlicensed radio channel not being clear for transmission of the random access preamble. Upon receiving the failure notification, the UE operates the MAC layer to instruct the physical layer to retransmit the random access preamble for the initiated random access procedure and operates the MAC layer to start a further RAR reception window for receiving a further random access response from the serving base station. The UE operates a preamble transmission counter to be increased in case any RAR reception window expires. The UE operates the MAC layer to inform an upper layer of the UE about a random access failure upon determining that the preamble transmission counter is above a maximum preamble transmission threshold.

According to an eleventh aspect, a user equipment is provided comprising processing circuitry, which, upon a random access procedure is initiated, operates to start a random access timer for completing the random access procedure successfully and operates a medium access control, MAC, layer of the UE to instruct a physical layer of the UE to transmit a random access preamble for the initiated random access procedure. The processing circuitry operates the physical layer to determine whether an unlicensed radio channel is clear for transmitting the random access preamble. Upon determining that the unlicensed radio channel is clear, the processing circuitry operates the physical layer and a transmitter of the UE to transmit the random access preamble. The processing circuitry operates the physical layer to transmit a notification to the MAC layer about the successful or unsuccessful transmission of the random access preamble. The processing circuitry operates the MAC layer to operate a random access response, RAR, reception window for receiving a random access response, based on the received notification. The processing circuitry operates the MAC layer to inform an upper layer of the UE about a random access failure upon determining that the random access timer expired.

According to a twelfth aspect provided in addition to the eleventh aspect, the processing circuitry operates a preamble transmission counter to be increased in case a RAR reception window expires. The processing circuitry operates the MAC layer to inform the upper layer about a random access failure upon determining that the preamble transmission counter is above a maximum preamble transmission threshold.

According to a thirteenth aspect provided in addition to the eleventh or twelfth aspect, a receiver of the UE receives configuration information via system information, indicating a value for the random access timer and optionally the maximum preamble transmission threshold. In an optional implementation, the configuration information is received from the serving base station.

According to a fourteenth aspect, provided in addition to any of the eleventh to thirteenth aspects, the processing circuitry, upon the random access procedure is initiated, operates the MAC layer to start the random access response, RAR, reception window for receiving the random access response. Upon determining that the unlicensed radio channel is not clear, the processing circuitry operates the physical layer to transmit a failure notification to the MAC layer about the unlicensed radio channel not being clear for transmission of the random access preamble. Upon receiving the failure notification, the processing circuitry, when in operation, operates the MAC layer to:

stop the previously started RAR reception window or abort the starting of the RAR reception window, instruct the physical layer to retransmit the random access preamble for the initiated random access procedure, and to start a further RAR reception window for receiving a further random access response from the serving base station.

In an optional implementation, the processing circuitry, when determining whether the unlicensed radio channel is clear, performs a clear channel assessment on the unlicensed radio channel.

According to a fifteenth aspect, provided in addition to any of the eleventh to fourteenth aspects, a receiver of the UE receives a random access procedure backoff indicator. The processing circuitry pauses the random access timer upon receiving the random access procedure backoff indicator, and resumes the random access timer when performing a retransmission of the random access preamble. Alternatively, the processing circuitry continues with the random access timer upon receiving the random access procedure backoff. In an optional implementation, the random access timer is configured to consider the random access procedure backoff indicator.

According to a sixteenth aspect, provided in addition to any of the eleventh to thirteenth aspects, upon determining that the unlicensed radio channel is clear, the processing circuitry operates the physical layer and a transmitter of the UE to transmit the random access preamble and transmit a successful notification to the MAC layer about the unlicensed radio channel being clear for transmission of the random access preamble. The processing circuitry, upon receiving the successful notification, operates the MAC layer to start a random access response, RAR, reception window for receiving a random access response.

According to a seventeenth aspect, provided in addition to any of the eleventh to thirteenth and the sixteenth aspects, a receiver of the UE receives downlink control information from a serving base station on which the UE is camping. The control information provides information on whether the serving base station has successfully acquired the unlicensed radio channel. The processing circuitry determines that the user equipment does not need to perform a clear channel assessment on the unlicensed radio channel before transmitting the random access preamble, based on the received downlink control information. In an optional implementation, the transmission of the random access preamble is performed within a defined time period after receiving the downlink control information, wherein during the time period the user equipment does not need to perform a clear channel assessment on the unlicensed radio cell for performing a transmission on the unlicensed radio channel.

According to a eighteenth aspect, provided in addition to any of the eleventh to thirteenth, the sixteenth and seventeenth aspects, the downlink control information is a common downlink control information. In addition or alternatively, the downlink control information includes information on the radio resources to be used for transmitting the random access preamble.

According to a nineteenth aspect, provided in addition to any of the sixth to ninth aspects, and to the eleventh to eighteenth aspects, the processing circuitry monitors the reception of reference signals to determine a continuous number of reference signals that are missing. The processing circuitry operates the MAC layer to inform an upper layer of the UE about the random access failure upon determining that the determined continuous number of reference signals that are missing is above a threshold.

According to a twentieth aspect, a method is provided comprising the following steps performed by a user equipment, UE. Upon a random access procedure is initiated, the UE operates to start a random access timer for completing the random access procedure successfully, and operates a medium access control, MAC, layer of the UE to instruct a physical layer of the UE to transmit a random access preamble for the initiated random access procedure. The UE operates the physical layer to determine whether an unlicensed radio channel is clear for transmitting the random access preamble. Upon determining that the unlicensed radio channel is clear, the UE operates the physical layer and a transmitter of the UE to transmit the random access preamble. The UE operates the physical layer to transmit a notification to the MAC layer about the successful or unsuccessful transmission of the random access preamble. The UE operates the MAC layer to operate a random access response, RAR, reception window for receiving a random access response, based on the received notification. The UE operates the MAC layer to inform an upper layer of the UE about a random access failure upon determining that the random access timer expired.

According to the twenty-first aspect, provided in addition to the twentieth aspect, upon the random access procedure is initiated, the UE operates the MAC layer to start the random access response, RAR, reception window for receiving the random access response. Upon determining that the unlicensed radio channel is not clear, the UE operates the physical layer to transmit a failure notification to the MAC layer about the unlicensed radio channel not being clear for transmission of the random access preamble. Upon receiving the failure notification, the UE operates the MAC layer to:
  stop the previously started RAR reception window or abort the starting of the RAR reception window,
  instruct the physical layer to retransmit the random access preamble for the initiated random access procedure, and
  to start a further RAR reception window for receiving a further random access response from the serving base station.

In an optional implementation, the method further comprises the step of performing a clear channel assessment on the unlicensed radio channel, when determining whether the unlicensed radio channel is clear.

According to a twenty-second aspect, provided in addition to the twentieth aspect, the UE receives downlink control information from a serving base station on which the UE is camping, the control information providing information on whether the serving base station has successfully acquired the unlicensed radio channel. The UE determines that the user equipment does not need to perform a clear channel assessment on the unlicensed radio channel before transmitting the random access preamble, based on the received downlink control information. In an optional implementation, the transmission of the random access preamble is performed within a defined time period after receiving the downlink control information, wherein during the time period the user equipment does not need to perform a clear channel assessment on the unlicensed radio cell for performing a transmission on the unlicensed radio channel.

According to a twenty-third aspect, a base station is provided comprising processing circuitry, which performs a clear channel assessment of an unlicensed radio cell. In case the clear channel assessment of the unlicensed radio cell is successful, the processing circuitry generates downlink control information indicating that the unlicensed radio cell is clear for transmission of a random access preamble. A transmitter of the base station transmits the downlink control information to a user equipment for being used for transmitting a random access problem of a random access procedure.

Hardware and Software Implementation of the Present Disclosure

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC (integrated circuit), a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred as a communication apparatus.

Some non-limiting examples of such communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT).

The communication may include exchanging data through, for example, a cellular system, a wireless LAN system, a satellite system, etc., and various combinations thereof.

The communication apparatus may comprise a device such as a controller or a sensor, which is coupled to a communication device performing a function of communication described in the present disclosure. For example, the communication apparatus may comprise a controller or a sensor that generates control signals or data signals, which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

Further, the various embodiments may also be implemented by means of software modules, which are executed by a processor or directly in hardware. Also a combination of software modules and a hardware implementation may be possible. The software modules may be stored on any kind of computer readable storage media, for example, RAM, EPROM, EEPROM, flash memory, registers, hard disks, CD-ROM, DVD, etc. It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A user equipment, UE, comprising:
a processing circuitry, which in operation, upon a random access procedure is initiated, operates a medium access control, MAC, layer of the UE to instruct a physical layer of the UE to transmit a random access preamble for the initiated random access procedure and operates the MAC layer to start a random access response, RAR, reception window for receiving a random access response; and
a transmitter,
wherein,
the processing circuitry, when in operation, operates the physical layer to determine whether an unlicensed radio channel is clear for transmitting the random access preamble,
upon determining that the unlicensed radio channel is not clear, the processing circuitry, when in operation, operates the physical layer to transmit a failure notification to the MAC layer about the unlicensed radio channel not being clear for transmission of the random access preamble,
upon receiving the failure notification, the processing circuitry, when in operation, operates the MAC layer to instruct the physical layer to retransmit the random access preamble for the initiated random access procedure and operates the MAC layer to start a further RAR reception window for receiving a further random access response from a serving base station,
the processing circuitry, when in operation, operates a preamble transmission counter to be increased in case any RAR reception window expires,
the processing circuitry, when in operation, operates the MAC layer to inform an upper layer of the UE about a random access failure upon determining that the preamble transmission counter is above a maximum preamble transmission threshold,
upon determining that the unlicensed radio channel is clear, the processing circuitry, when in operation, operates the physical layer and the transmitter of the UE to transmit the random access preamble,
the processing circuitry, when in operation, monitors, during the time period of any RAR reception window, the reception of the random access response, and
the processing circuitry, when in operation, does not monitor, during the time period of any RAR reception window, the reception of the random access response in case the failure notification is received for that RAR reception window.

2. The user equipment according to claim 1, wherein upon receiving the random access response or a random access procedure backoff indicator, the processing circuitry, when in operation, operates the MAC layer to stop the RAR reception window that was started for that random access preamble corresponding to the received random access response.

3. The user equipment according to claim 1, wherein upon receiving the random access response or a random access procedure backoff indicator, the processing circuitry, when in operation, operates the MAC layer to stop all the running RAR reception windows.

4. A method performed by a user equipment, UE, the method comprising:
upon a random access procedure is initiated, operating a medium access control, MAC, layer of the UE to instruct a physical layer of the UE to transmit a random access preamble for the initiated random access procedure and operating the MAC layer to start a random access response, RAR, reception window for receiving a random access response,
operating the physical layer to determine whether an unlicensed radio channel is clear for transmitting the random access preamble,
upon determining that the unlicensed radio channel is not clear, operating the physical layer to transmit a failure notification to the MAC layer about the unlicensed radio channel not being clear for transmission of the random access preamble,
upon receiving the failure notification, operating the MAC layer to instruct the physical layer to retransmit the random access preamble for the initiated random access procedure and operating the MAC layer to start a further RAR reception window for receiving a further random access response from a serving base station,
operating a preamble transmission counter to be increased in case any RAR reception window expires,
operating the MAC layer to inform an upper layer of the UE about a random access failure upon determining that the preamble transmission counter is above a maximum preamble transmission threshold,
monitoring reception of reference signals to determine a continuous number of reference signals that are missing, and
operating the MAC layer to inform the upper layer of the UE about the random access failure upon determining that the determined continuous number of reference signals that are missing is above a threshold.

5. The method according to claim 4, comprising:
upon receiving the random access response or a random access procedure backoff indicator, operating the MAC layer to stop the RAR reception window that was started for that random access preamble corresponding to the received random access response.

6. The method according to claim 4, comprising:
upon receiving the random access response or a random access procedure backoff indicator, operating the MAC layer to stop all the running RAR reception windows.

7. A user equipment, UE, comprising:
a processing circuitry, which in operation, upon a random access procedure is initiated, operates to start a random access timer for completing the random access procedure successfully, and operates a medium access control, MAC, layer of the UE to instruct a physical layer of the UE to transmit a random access preamble for the initiated random access procedure; and
a transmitter,
wherein,
the processing circuitry, when in operation, operates the physical layer to determine whether an unlicensed radio channel is clear for transmitting the random access preamble,
upon determining that the unlicensed radio channel is clear, the processing circuitry, when in operation, operates the physical layer and the transmitter of the UE to transmit the random access preamble,
the processing circuitry, when in operation, operates the physical layer to transmit a notification to the MAC layer about the successful or unsuccessful transmission of the random access preamble,
the processing circuitry, when in operation, operates the MAC layer to operate a random access response, RAR, reception window for receiving a random access response, based on the received notification,
the processing circuitry, when in operation, operates the MAC layer to inform an upper layer of the UE about a random access failure upon determining that the random access timer expired,
the processing circuitry, when in operation, operates a preamble transmission counter to be increased in case the RAR reception window expires, and
the processing circuitry, when in operation, operates the MAC layer to inform the upper layer about the random access failure upon determining that the preamble transmission counter is above a maximum preamble transmission threshold.

8. The user equipment according to claim 7, wherein
the processing circuitry, upon the random access procedure is initiated, operates the MAC layer to start the RAR reception window for receiving the random access response,
upon determining that the unlicensed radio channel is not clear, the processing circuitry, when in operation, operates the physical layer to transmit a failure notification to the MAC layer about the unlicensed radio channel not being clear for transmission of the random access preamble,
upon receiving the failure notification, the processing circuitry, when in operation, operates the MAC layer to:
stop the previously started RAR reception window or abort the starting of the RAR reception window,
instruct the physical layer to retransmit the random access preamble for the initiated random access procedure, and
start a further RAR reception window for receiving a further random access response from a serving base station, and
the processing circuitry, when determining whether the unlicensed radio channel is clear, performs a clear channel assessment on the unlicensed radio channel.

9. The user equipment according to claim 7, wherein
upon determining that the unlicensed radio channel is clear, the processing circuitry, when in operation, operates the physical layer and the transmitter of the UE to transmit the random access preamble and transmit a successful notification to the MAC layer about the unlicensed radio channel being clear for transmission of the random access preamble, and
the processing circuitry, upon receiving the successful notification, operates the MAC layer to start the RAR reception window for receiving the random access response.

10. A user equipment, UE, comprising:
a processing circuitry, which in operation, upon a random access procedure is initiated, operates to start a random access timer for completing the random access procedure successfully, and operates a medium access control, MAC, layer of the UE to instruct a physical layer of the UE to transmit a random access preamble for the initiated random access procedure; and
a transmitter,
wherein,
the processing circuitry, when in operation, operates the physical layer to determine whether an unlicensed radio channel is clear for transmitting the random access preamble,
upon determining that the unlicensed radio channel is clear, the processing circuitry, when in operation, operates the physical layer and the transmitter of the UE to transmit the random access preamble,
the processing circuitry, when in operation, operates the physical layer to transmit a notification to the MAC layer about the successful or unsuccessful transmission of the random access preamble,
the processing circuitry, when in operation, operates the MAC layer to operate a random access response, RAR, reception window for receiving a random access response, based on the received notification,
the processing circuitry, when in operation, operates the MAC layer to inform an upper layer of the UE about a random access failure upon determining that the random access timer expired,
the UE further comprises a receiver, which in operation, receives downlink control information from a serving base station on which the UE is camping, the control information providing information on whether the serving base station has successfully acquired the unlicensed radio channel,
the processing circuitry, when in operation, determines that the UE does not need to perform a clear channel assessment on the unlicensed radio channel before transmitting the random access preamble, based on the received downlink control information, and
the transmission of the random access preamble is performed within a defined time period after receiving the downlink control information, wherein during the time period the UE does not need to perform a clear channel assessment on the unlicensed radio cell for performing a transmission on the unlicensed radio channel.

11. The user equipment according to claim 10, wherein
the processing circuitry, upon the random access procedure is initiated, operates the MAC layer to start the RAR reception window for receiving the random access response,
upon determining that the unlicensed radio channel is not clear, the processing circuitry, when in operation, operates the physical layer to transmit a failure notification to the MAC layer about the unlicensed radio channel not being clear for transmission of the random access preamble,
upon receiving the failure notification, the processing circuitry, when in operation, operates the MAC layer to:
stop the previously started RAR reception window or abort the starting of the RAR reception window,
instruct the physical layer to retransmit the random access preamble for the initiated random access procedure, and
start a further RAR reception window for receiving a further random access response from a serving base station, and
the processing circuitry, when determining whether the unlicensed radio channel is clear, performs a clear channel assessment on the unlicensed radio channel.

12. The user equipment according to claim 10, wherein
upon determining that the unlicensed radio channel is clear, the processing circuitry, when in operation, operates the physical layer and the transmitter of the UE to transmit the random access preamble and transmit a successful notification to the MAC layer about the unlicensed radio channel being clear for transmission of the random access preamble, and
the processing circuitry, upon receiving the successful notification, operates the MAC layer to start the RAR reception window for receiving the random access response.

13. A user equipment, UE, comprising:
a processing circuitry, which in operation, upon a random access procedure is initiated, operates a medium access control, MAC, layer of the UE to instruct a physical layer of the UE to transmit a random access preamble for the initiated random access procedure and operates the MAC layer to start a random access response, RAR, reception window for receiving a random access response; and
a transmitter,
wherein,
the processing circuitry, when in operation, operates the physical layer to determine whether an unlicensed radio channel is clear for transmitting the random access preamble,
upon determining that the unlicensed radio channel is not clear, the processing circuitry, when in operation, operates the physical layer to transmit a failure notification to the MAC layer about the unlicensed radio channel not being clear for transmission of the random access preamble,
upon receiving the failure notification, the processing circuitry, when in operation, operates the MAC layer to instruct the physical layer to retransmit the random access preamble for the initiated random access procedure and operates the MAC layer to start a further RAR reception window for receiving a further random access response from a serving base station,
the processing circuitry, when in operation, operates a preamble transmission counter to be increased in case any RAR reception window expires,
the processing circuitry, when in operation, operates the MAC layer to inform an upper layer of the UE about a random access failure upon determining that the preamble transmission counter is above a maximum preamble transmission threshold,
the processing circuitry, when in operation, monitors reception of reference signals to determine a continuous number of reference signals that are missing, and
the processing circuitry, when in operation, operates the MAC layer to inform the upper layer of the UE about the random access failure upon determining that the determined continuous number of reference signals that are missing is above a threshold.

14. The user equipment according to claim 13, wherein upon receiving the random access response or a random access procedure backoff indicator, the processing circuitry, when in operation, operates the MAC layer to stop the RAR reception window that was started for that random access preamble corresponding to the received random access response.

15. The user equipment according to claim 13, wherein upon receiving the random access response or a random access procedure backoff indicator, the processing circuitry, when in operation, operates the MAC layer to stop all the running RAR reception windows.

16. A method comprising the following steps performed by a user equipment, UE:
upon a random access procedure is initiated, operating to start a random access timer for completing the random access procedure successfully, and operating a medium access control, MAC, layer of the UE to instruct a physical layer of the UE to transmit a random access preamble for the initiated random access procedure,
operating the physical layer to determine whether an unlicensed radio channel is clear for transmitting the random access preamble,
upon determining that the unlicensed radio channel is clear, operating the physical layer and a transmitter of the UE to transmit the random access preamble,
operating the physical layer to transmit a notification to the MAC layer about the successful or unsuccessful transmission of the random access preamble,
operating the MAC layer to operate a random access response, RAR, reception window for receiving a random access response, based on the received notification,
operating the MAC layer to inform an upper layer of the UE about a random access failure upon determining that the random access timer expired,
operating a preamble transmission counter to be increased in case the RAR reception window expires, and
operating the MAC layer to inform the upper layer about the random access failure upon determining that the preamble transmission counter is above a maximum preamble transmission threshold.

* * * * *